US012762761B2

(12) United States Patent
Chen et al.

(10) Patent No.: US 12,762,761 B2
(45) **Date of Patent: *Oct. 13, 2026**

(54) METHOD AND APPARATUS FOR DISPLAYING VIRTUAL LANDSCAPE PICTURE, STORAGE MEDIUM, AND ELECTRONIC DEVICE

(71) Applicant: TENCENT TECHNOLOGY (SHENZHEN) COMPANY LIMITED, Shenzhen (CN)

(72) Inventors: Yugang Chen, Shenzhen (CN); He Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 169 days.

This patent is subject to a terminal disclaimer.

(21) Appl. No.: 18/738,345

(22) Filed: Jun. 10, 2024

(65) Prior Publication Data

US 2024/0331221 A1 Oct. 3, 2024

Related U.S. Application Data

(63) Continuation of application No. 17/969,894, filed on Oct. 20, 2022, now Pat. No. 12,045,913, which is a (Continued)

(30) Foreign Application Priority Data

Jan. 7, 2021 (CN) ......................... 202110019382.2

(51) Int. Cl.

| | |
|---|---|
| ***G06T 11/10*** | (2026.01) |
| ***G06T 3/4007*** | (2024.01) |
| *A63F 13/60* | (2014.01) |

(52) U.S. Cl.

CPC ............ *G06T 11/10* (2026.01); *G06T 3/4007* (2013.01); *A63F 13/60* (2014.09)

(58) Field of Classification Search

CPC ....... G06T 11/10; G06T 3/4007; G06T 11/40; G06T 11/60; A63F 13/60; A63F 13/52

See application file for complete search history.

(56) References Cited

U.S. PATENT DOCUMENTS

| | | | | |
|---|---|---|---|---|
| 12,045,913 | B2 * | 7/2024 | Chen ....................... | A63F 13/52 |
| 2008/0094409 | A1 | 4/2008 | Koguchi et al. | |

(Continued)

FOREIGN PATENT DOCUMENTS

| | | | |
|---|---|---|---|
| CN | 108389176 | A | 8/2018 |
| CN | 109685869 | A | 4/2019 |

(Continued)

OTHER PUBLICATIONS

The World Intellectual Property Organization (WIPO) International Search Report for PCT/CN2021/142924 Mar. 29, 2022 7 Pages (including translation).

(Continued)

*Primary Examiner* — Maurice L. McDowell, Jr.

(74) *Attorney, Agent, or Firm* — Anova Law Group, PLLC

(57) ABSTRACT

The present application discloses a method and apparatus for displaying a virtual landscape picture, a storage medium, and an electronic device. The method includes acquiring a plurality of landscape layer types comprised in the target landscape area to be displayed and determining a type weight corresponding to each landscape layer type in the plurality of landscape layer types; screening at least one target landscape layer type with a corresponding type weight which satisfies a condition from the plurality of landscape layer types, and acquiring an index value of a landscape (Continued)

layer corresponding to each of the screened at least one target landscape layer type; and sequentially storing the index value in each image color channel of the landscape layer index map to obtain the landscape layer index map corresponding to the target landscape area to be displayed.

20 Claims, 12 Drawing Sheets

Related U.S. Application Data continuation of application No. PCT/CN2021/142924, filed on Dec. 30, 2021.

(56) References Cited

U.S. PATENT DOCUMENTS

| | | | |
|---|---|---|---|
| 2012/0280973 | A1 | 11/2012 | Nagy |
| 2020/0143589 | A1 | 5/2020 | Sikachev |

FOREIGN PATENT DOCUMENTS

| | | | | | |
|---|---|---|---|---|---|
| CN | 109920038 | A | | 6/2019 | |
| CN | 110665232 | A | | 1/2020 | |
| CN | 110930486 | A | | 3/2020 | |
| CN | 111097169 | A | | 5/2020 | |
| CN | 111111172 | A | | 5/2020 | |
| CN | 111402117 | A | | 7/2020 | |
| CN | 111467805 | A | | 7/2020 | |
| CN | 111597003 | A | | 8/2020 | |
| CN | 111803952 | A | * | 10/2020 | ............. A63F 13/63 |
| CN | 111957046 | A | * | 11/2020 | ............. A63F 13/60 |
| CN | 112675545 | A | | 4/2021 | |
| JP | 2006263479 | A | | 10/2006 | |
| JP | 2015184854 | A | | 10/2015 | |
| WO | 2007103388 | A2 | | 9/2007 | |

OTHER PUBLICATIONS

The Japan Patent Office (JPO) Notification of Reasons for Refusal for Application No. 2023-519590 and Translation Apr. 23, 2024 7 Pages.

"Landscape Material Layer Blending, Setting up materials to work with Landscape terrains" , https://docs.unrealengine.com/5.0/en-US/landscape-material-layer-blending-in-unreal-engine/,Aug. 2019.

Guillaume Werle et al. " 'Ghost Recon Wildlands': Terrain Tools and Technology", https://www.gdcvault.com/play/1024029/-Ghost-Recon-Wildlands-Terrain, Mar. 2017.

* cited by examiner

| | | | | | |
|---|---|---|---|---|---|
| X8 | X0 | X4 | Y8 | Y0 | Y4 |
| X7 | X6 | X5 | Y7 | Y6 | Y5 |
| Z1 | Z2 | Z3 | W1 | W2 | W3 |
| Z8 | Z0 | Z4 | W8 | W0 | W4 |
| Z7 | Z6 | Z5 | W7 | W6 | W5 |

METHOD AND APPARATUS FOR DISPLAYING VIRTUAL LANDSCAPE PICTURE, STORAGE MEDIUM, AND ELECTRONIC DEVICE

RELATED APPLICATIONS

This application is a continuation of U.S. application Ser. No. 17/969,894 filed on Oct. 20, 2022; U.S. application Ser. No. 17/969,894 is a continuation of PCT Application No. PCT/CN2021/142924, filed on Dec. 30, 2021, which claims priority to Chinese Patent Application No. 202110019382.2, entitled "METHOD AND APPARATUS FOR DISPLAYING SIMULATED LANDSCAPE PICTURE, STORAGE MEDIUM, AND ELECTRONIC DEVICE" filed with the National Intellectual Property Administration, PRC on Jan. 7, 2021. The three applications are incorporated by reference in their entirety.

FIELD OF THE TECHNOLOGY

The present application relates to the field of computers, and in particular to a method and apparatus for displaying a virtual landscape picture, a storage medium, and an electronic device.

BACKGROUND OF THE DISCLOSURE

In the virtual scene provided by many terminal applications, in order to show users a virtual landscape picture close to the picture of the landscape in the real world, a plurality of terrain components is often used for simulating the landscape morphology of different layers, and each landscape layer is used for representing a pair of texture maps of different landscape layer types. One is a main map, which is used for storing main color information. The other is a normal map, which is used for storing normal information, to facilitate the lighting calculation so that the virtual landscape picture can display the uneven terrain on the landscape.

SUMMARY

The embodiments of the present application provide a method and apparatus for displaying a virtual landscape picture, a storage medium, and an electronic device, to at least solve the technical problem of complicated display operation due to a large number of times of sampling.

One aspect of the embodiments of the present application provides a method for displaying a virtual landscape picture, executed by a terminal. The method includes acquiring a plurality of landscape layer types comprised in the target landscape area to be displayed and determining a type weight corresponding to each landscape layer type in the plurality of landscape layer types; screening at least one target landscape layer type with a corresponding type weight which satisfies a condition from the plurality of landscape layer types, and acquiring an index value of a landscape layer corresponding to each of the screened at least one target landscape layer type; and sequentially storing the index value in each image color channel of the landscape layer index map to obtain the landscape layer index map corresponding to the target landscape area to be displayed.

One or more non-transitory readable storage media are provided, storing computer-readable instructions, the computer-readable instructions, when executed by one or more processors, causing the one or more processors to perform the steps of the method for displaying a virtual landscape picture.

A computer device is provided, including a memory and one or more processors, the memory storing computer-readable instructions, the computer-readable instructions, when executed by the processors, causing the one or more processors to perform the steps of the method for displaying a virtual landscape picture.

DESCRIPTION OF EMBODIMENTS

Figure 1:
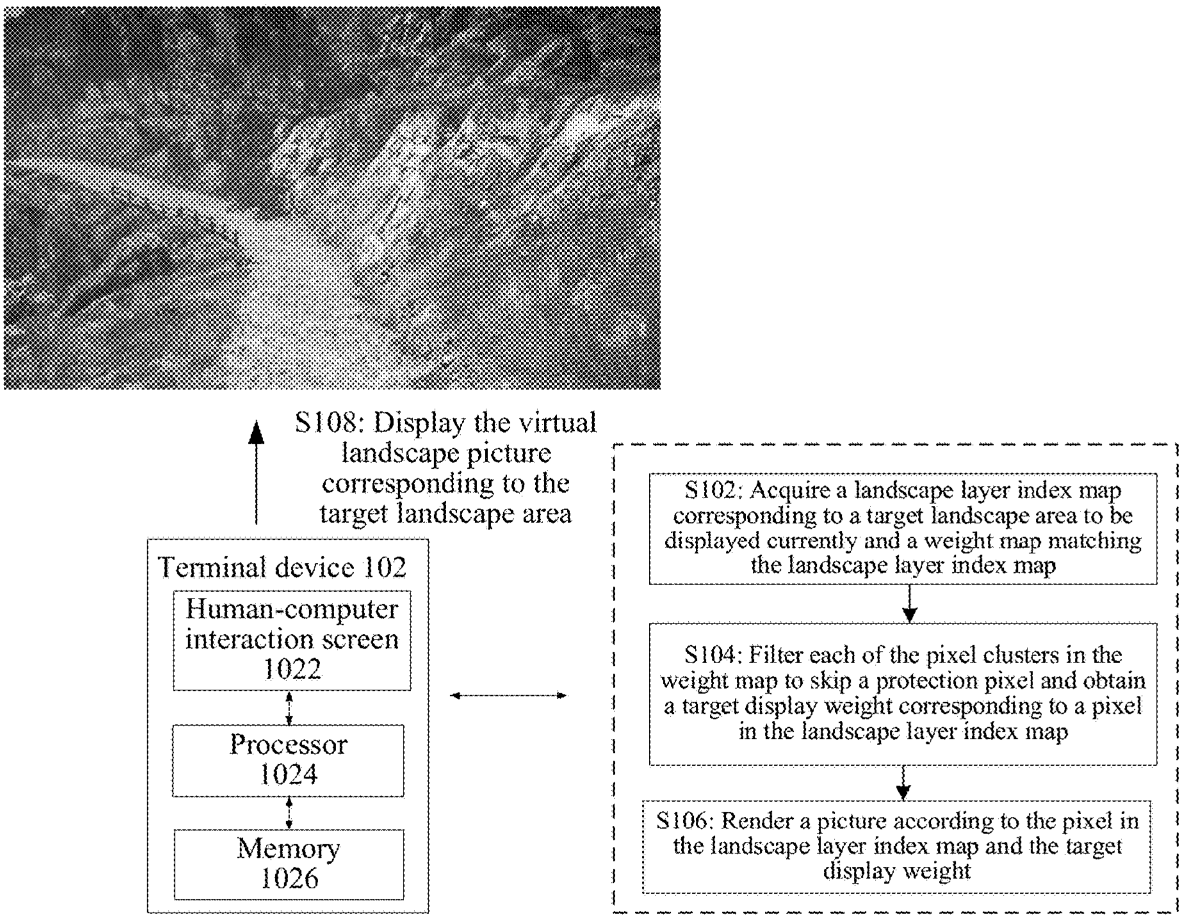
FIG. 1 is a schematic diagram of a hardware environment of a method for displaying a virtual landscape picture according to an embodiment of the present application.

It is to be understood that, in the specification, claims, and accompanying drawings of this application, the terms "first", "second", and so on are intended to distinguish between similar objects but do not necessarily indicate a specific order or sequence. It is to be understood that data used in this way is exchangeable in a proper case, so that the embodiments of the present application described herein can be implemented in an order different from the order shown or described herein. Moreover, the terms "comprise", "include", and any other variants thereof mean to cover the non-exclusive inclusion. For example, a process, method, system, product, or device that includes a list of steps or units is not necessarily limited to those steps or units that are clearly listed, but may include other steps or units not expressly listed or inherent to such a process, method, system, product, or device.

In the embodiments of this application, the following technical terms, but not limited thereto, may be used:

Rendering: it is a process of converting basic primitives (triangles, quadrangles, points, lines, etc.) to 2D screen pixels.

Landscape: it is a function provided by computer engines, which can be used for creating highly complex landscapes.

Landscape layer: it is a pair of texture maps used for representing different landscape layer types, usually including two maps. One is a main map, which is used for storing main color information. The other is a normal map, which is used for storing normal information, to facilitate the lighting calculation so that the virtual landscape picture can display the uneven terrain on the landscape.

Texture splatting technology: it is a method of using one map to solve the mixing of a plurality of landscape layer types. It uses RGBA four channels of a map to store the weights of four landscape layers. Finally, the landscapes are mixed according to the weight information.

UE4: the full name is Unreal Engine 4, a next-generation commercial game engine. This engine can be used for creating games with very realistic picture effects and high operation performance, and can be adapted to create a variety of game platforms ranging from simple mobile small games to 3A large games.

Graphics Processing Unit (GPU): a special chip used for graphics and image processing in modern personal computers, servers, mobile devices, game consoles, etc.

Frame buffer memory: it is referred to as frame buffer or display memory and is a direct mapping of a picture displayed by a screen, also known as bit map or raster. Each storage unit of the frame buffer corresponds to one pixel on the screen, and the entire frame buffer corresponds to one frame of image. A common frame buffer includes a color buffer and a depth buffer. According to the hardware environment or game development needs, it may further include a template buffer and a multi-sampling buffer.

Active/inactive: "active" represents that an object or component normally plays its role in the game, while "inactive" represents that it will not play any role in the game and can be regarded as non-existent. However, even if an inactive object/component is already loaded into the scene, it will be faster to change it into an active object/component than to temporarily load the object/component, to prevent freezing.

Display memory: it is also known as frame buffer. It is used for storing rendering data processed or to be read by a display chip. Like a computer memory, the display memory is the hardware used for storing graphics data. A picture displayed on a display is composed of pixel points. The brightness and color of each pixel point are controlled by using 4-64 bit data. These points form a frame of graphic picture. In order to keep the picture smooth, the pixel data of multiple frames to be output and processed must be saved through the display memory to achieve the buffering effect, and then are transferred to the display chip and the central processing unit for deployment. Finally, the operation results are converted into graphics which are then output to the display.

Internal memory: it is an internal memory that directly exchanges data with the Central Processing Unit (CPU) and is used for loading various programs and data for the CPU to directly run and call. On mobile devices, the display memory and the internal memory share the same memory chip and the same channel for data exchange. This hardware feature greatly limits the bandwidth of the display memory on the mobile devices.

Actor, component, section and quad: it is a multi-level segmentation method of landscape components.

One method for displaying a virtual landscape picture is to use one map to mix a plurality of landscape layer types, for example, through four channels of RGBA (Red, Green, Blue, Alpha) in this map. Specifically, weights for representing the four landscape layers are respectively stored in the four RGBA channels, and a plurality of landscape layer types are mixed according to the weights to generate a virtual landscape picture to be displayed.

However, the information in each channel in the map can be obtained after 9 times of texture sampling. In other words, as the number of landscape layers increases, the number of times of texture sampling corresponding to this method will also increase significantly. However, only a part of a terrain layer is rendered in a certain landscape block area, and the weight of the rest is 0. This landscape block area still needs to be sampled. That is, if the virtual landscape picture is displayed by adopting related technologies, the display operation is complicated due to the large number of times of sampling.

One aspect of the embodiments of the present application provides a method for displaying a virtual landscape picture. In some embodiments, the method for displaying a virtual landscape picture described above can be applied to, but not limited to, a system for displaying the virtual landscape picture in the hardware environment illustrated in FIG. 1. The system for displaying a virtual landscape picture may include, but not limited to, a terminal device 102. A target application client (such as a game application client, a navigation application client, etc.) is running in the terminal device 102. The terminal device 102 includes a human-computer interaction screen 1022, a processor 1024, and a memory 1026. The human-computer interaction screen 1022 is configured to present an interface in a virtual scene provided in the target application client, such as the virtual landscape picture to be displayed in this embodiment. It is further configured to provide a human-computer interaction interface to receive a human-computer interaction operation performed on the human-computer interaction interface. The processor 1024 is configured to obtain a human-computer interaction instruction in response to the human-computer interaction operation, such as a rendering instruction for rendering the virtual landscape picture. The memory 1026 is configured to store the landscape layer index map and weight map (such as the memory in the terminal device) and also to store the virtual landscape picture to be displayed (such as the frame buffer in the terminal device).

The specific process includes the following steps. It is assumed that there is a game application client running in the terminal device 102, and the game application client will render and display a picture of a mountain path provided by the game virtual scene by using the method provided in this embodiment, as illustrated in FIG. 1. The specific steps are as steps S102-S108.

In step S102, a landscape layer index map corresponding to a target landscape area to be displayed currently is acquired in the terminal device 102, and a weight map matching the landscape layer index map is acquired. Then, in step S104, filtering calculation is performed on each pixel cluster in the weight map to skip a protection pixel to obtain a target display weight corresponding to a pixel in the landscape layer index map (for example, through the graphic processing unit GPU in the terminal device). In step S106, picture rendering is performed according to the landscape layer index map and the target display weight in the weight map, to implement step S108, i.e., displaying the virtual landscape picture corresponding to the target landscape area.

It is to be understood that, in this embodiment, a landscape layer index map corresponding to a target landscape area to be displayed currently and a weight map matching the landscape layer index map are acquired. Each pixel in each image color channel in the landscape layer index map is used for storing an index value of one landscape layer in a texture array, a target display weight cluster of the one landscape layer is correspondingly stored in a pixel cluster in each image color channel of the weight map, the pixel cluster includes a reference pixel corresponding to the pixel in the landscape layer index map and a protection pixel matching the reference pixel. The pixel cluster further includes a protection pixel matching the pixel in the landscape layer index map, and the display weight cluster includes a target display weight for displaying the one landscape layer on the pixel in the landscape layer index map. The display weight cluster includes a target display weight of the reference pixel and a reference weight corresponding to the protection pixel matching the pixel in the landscape layer index map. It is to be understood that the target display weight is the pixel value of the reference pixel, and the reference weight is the pixel value of the protection pixel. Then, the terminal performs filtering calculation on each pixel cluster in the weight map to skip the protection pixel to obtain the target display weight corresponding to the pixel in the landscape layer index map, and performs picture rendering according to the landscape layer index map and the target display weight in the weight map to display the virtual landscape picture corresponding to the target landscape area. That is to say, two maps, i.e., the landscape layer index map and the weight map are used for replacing one map (such as splat map) commonly used in the related technologies. The information corresponding to different types of landscape layers for rendering and display is recorded and stored by using each image color channel of each pixel in the two maps, and it is not limited by sampling, thus simplifying the rendering and display operation of the highly complex virtual landscape picture, and avoiding the problem of complicated display operation of the virtual landscape picture due to the increase in the number of times of sampling because of the increase in the number of landscape layers.

Figure 2:
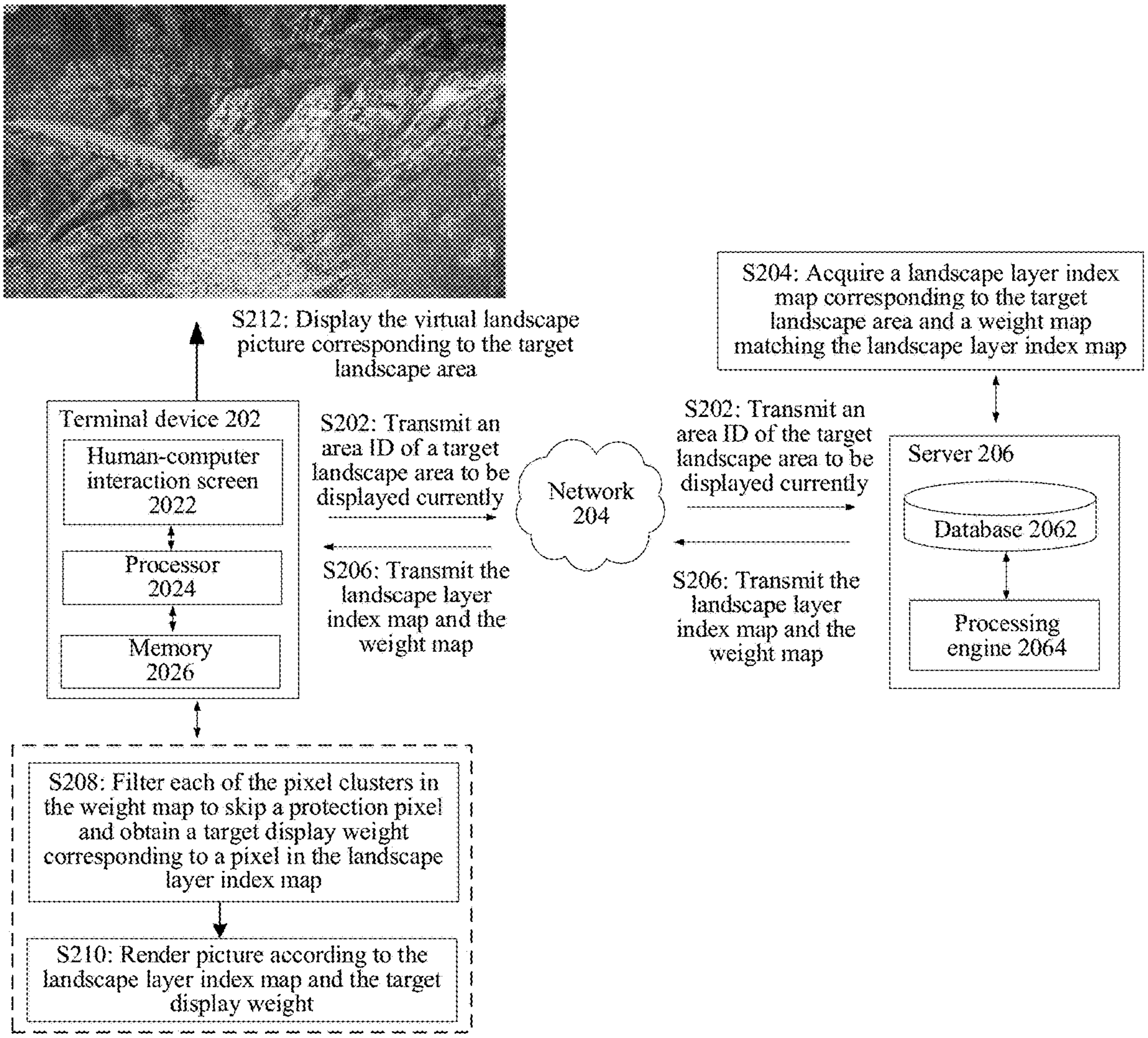
FIG. 2 is a schematic diagram of a hardware environment of another method for displaying a virtual landscape picture according to an embodiment of the present application.

In one embodiment, the method for displaying a virtual landscape picture described above can be applied to, but not limited to, a system for displaying the virtual landscape picture in the hardware environment illustrated in FIG. 2. The system for displaying a virtual landscape picture may include, but not limited to, a terminal device 202. A target application client (such as a game application client, a navigation application client, etc.) is running in the terminal device 202. The terminal device 202 includes a human-computer interaction screen 2022, a processor 2024, and a memory 2026. The human-computer interaction screen 2022 is configured to present an interface in a virtual scene provided in the target application client, such as the virtual landscape picture to be displayed in this embodiment. It is further configured to provide a human-computer interaction interface to receive a human-computer interaction operation performed on the human-computer interaction interface. The processor 2024 is configured to obtain a human-computer interaction instruction in response to the human-computer interaction operation, such as a rendering instruction for rendering the virtual landscape picture. The memory 2026 is configured to store the landscape layer index map and weight map (such as the memory in the terminal device) and also to store the virtual landscape picture to be displayed (such as the frame buffer in the terminal device).

In addition, a server 206 includes a database 2062 and a processing engine 2064. The database 2062 is configured to store the landscape layer index map and weight map. The processing engine 2064 is configured to search and acquire the landscape layer index map and weight map.

The specific process includes the following steps: it is assumed that there is a game application client running in the terminal device 202, and the game application client will render and display a picture of a mountain path provided by the game virtual scene by using the method provided in this embodiment, as illustrated in FIG. 2. The specific steps are as steps S202-S212.

In step S202, a target landscape area to be displayed currently is determined in the terminal device 202 and an area ID of the target landscape area is transmitted to a server 206 through a network 204.

In step S204, the server 206 acquires a landscape layer index map corresponding to the target landscape area to be displayed currently according to the area ID and a weight map matching the landscape layer index map, and returns the landscape layer index map and the weight map to the terminal device 202 through the network 204, as shown in step S206.

Then, steps S208-S210 are executed in the terminal device 202, that is, filtering calculation is performed on each pixel cluster in the weight map to skip the protection pixel to obtain the target display weight corresponding to the pixel in the landscape layer index map, and picture rendering is performed according to the landscape layer index map and the target display weight in the weight map, to execute step S212, i.e., displaying the virtual landscape picture corresponding to the target landscape area.

In some embodiments, the terminal device may be a terminal device configured with a target client, and may include, but not limited to, at least one of the following: a mobile phone (for example, an Android mobile phone, or an iOS mobile phone), a notebook computer, a tablet computer, a palmtop computer, a Mobile Internet Device (MID), a PAD, a desktop computer, a start TV, and the like. The target client may be an application client that needs to reproduce and display a virtual landscape picture, such as a game application client or a navigation application client. The network may include, but not limited to, a wired network and a wireless network. The wired network includes LAN, MAN and WAN. The wireless network includes Bluetooth, WIFI, and other networks implementing wireless communication. The server may be a single server, a server cluster that is composed of a plurality of servers, or a cloud server. The foregoing description is merely an example, which is not limited in this embodiment.

Figure 3:
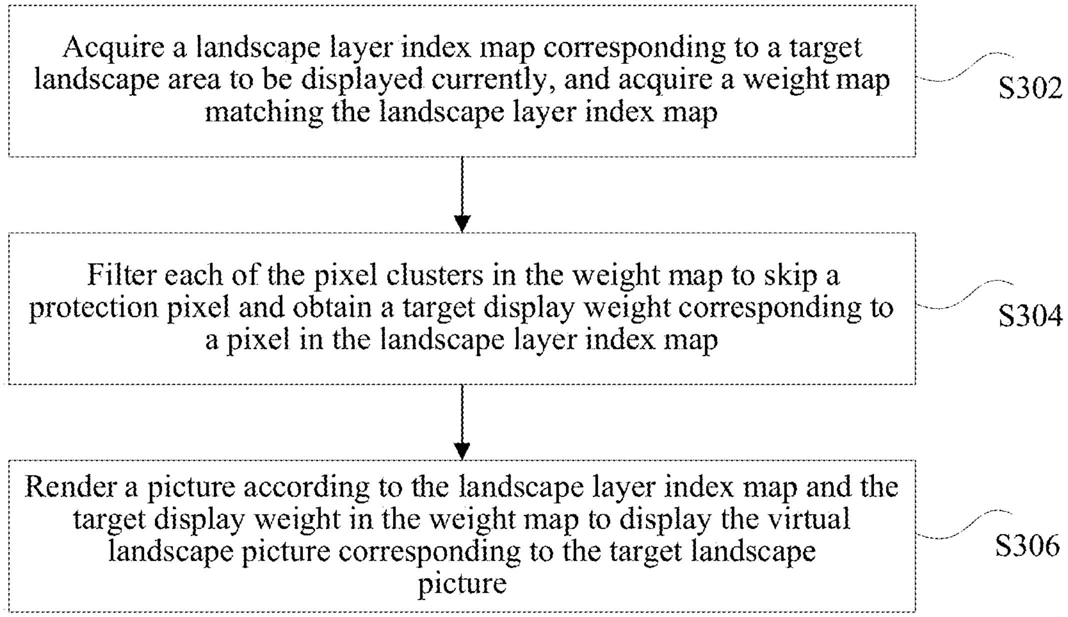
FIG. 3 is a flowchart of another method for displaying a virtual landscape picture according to an embodiment of the present application.

In some embodiments, In one embodiment, referring to FIG. 3, the method for displaying the virtual landscape picture includes the following steps:

In step S302, a landscape layer index map corresponding to a target landscape area to be displayed currently and a weight map matching the landscape layer index map are acquired. Each pixel in each image color channel in the landscape layer index map is used for storing an index value of one landscape layer in a texture array. A display weight cluster of the one landscape layer is correspondingly stored in a pixel cluster in each image color channel of the weight map. The pixel cluster includes a reference pixel and a protection pixel matching the reference pixel. The reference pixel is a pixel having a mapping relationship with a pixel in the landscape layer index map. The protection pixel matching the reference pixel is a pixel having a positional association relationship with the reference pixel and representing a virtual landscape layer. The display weight cluster includes a target display weight corresponding to the reference pixel and a reference weight corresponding to the protection pixel.

In step S304, filtering calculation is performed on each pixel cluster in the weight map to skip a protection pixel and obtain a target display weight corresponding to a pixel in the landscape layer index map.

In step S306, picture rendering is performed according to the landscape layer index map and the target display weight in the weight map to display the virtual landscape picture corresponding to the target landscape area.

In some embodiments, the method for displaying the virtual landscape picture described above can be applied to, but not limited to, a process of rendering and displaying the highly complex virtual landscape picture. For example, for game applications with high virtual requirements, in order to improve the real experience of players in the virtual game scene, the application developers often strive to highly restore the environmental elements in the virtual game scene, to reproduce the real environment to the players and make them feel immersive in the game process. For another example, for Augmented Reality (AR) navigation applications, in order to make users feel the real environment changes during navigation, the environmental elements can also be highly restored in the navigation map. The above is only an example. The method for displaying the virtual landscape picture provided in this embodiment can also be applied to other application scenarios, such as energy development and exploration platform applications, to assist in displaying different types of landscapes, to improve the exploration and mining efficiency.

It is to be understood that a landscape area is often a mixture of different landscape layer types. When displaying the highly complex virtual landscape picture, it is necessary to perform superposition calculation on the mixing ratio of different landscape layer types. In order to achieve the purpose, in this embodiment, two maps, i.e., the landscape layer index map and the weight map are used for replacing one map (such as splat map) commonly used in the related technologies. The information corresponding to different types of landscape layers for rendering and display is recorded and stored by using each image color channel of each pixel in the two maps, thus simplifying the rendering and display operation of the highly complex virtual landscape picture, and improving the rendering effect.

In some embodiments, the landscape layer index map (also known as index map) is a map configured with multiple image color channels, such as RGBA (Red, Green, Blue, Alpha) four channels. An index value (hereinafter also referred to as subscript (index)) of one landscape layer in a texture array is stored in each pixel in each image color channel of the map.

Figure 4:
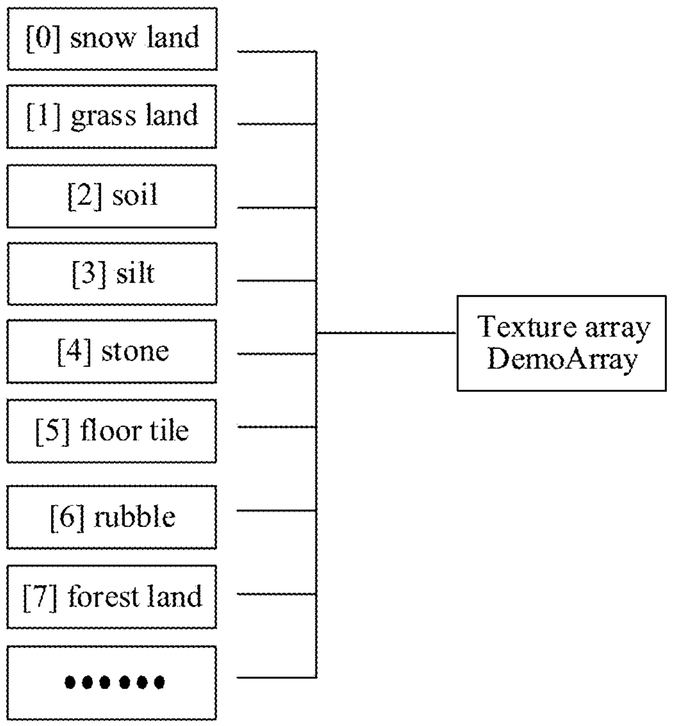
FIG. 4 is a schematic diagram of a method for displaying a virtual landscape picture according to an embodiment of the present application.

The texture array can store a batch of texture data by using an array to facilitate data access through subscript (index). For example, referring to FIG. 4, it is assumed that the texture array DemoArray=[snow land, grass land, soil, silt, stone, floor tile, rubble, forest land]. Therefore, DemoArray [5]=floor tile. The array here is a mark with subscript from 0, 0=snow land, 1=grass land, 2=soil, and so on.

In some embodiments, the weight map is a map configured with multiple image color channels, such as RGBA (Red, Green, Blue, Alpha) four channels. A display weight cluster corresponding to the one landscape layer is stored in a pixel cluster in each image color channel of the map.

It is to be understood that there is a mapping relationship between a pixel cluster in the weight map and a pixel in the landscape layer index map. The pixel cluster includes a reference pixel having a mapping relationship with a pixel in the landscape layer index map and a protection pixel matching the reference pixel. Here, the display weight cluster corresponding to the pixel cluster is a mixing weight of the landscape layer, specifically including the target display weight corresponding to the landscape layer indicated by the pixel in the landscape layer index map stored in the reference pixel, and the reference weight stored in the protection pixel. The protection pixel and the reference pixel here have a positional association relationship. The reference weight and the target display weight here also have an association relationship. Therefore, the resolution of the weight map in this embodiment is Q times that of the landscape layer index map, where q is determined according to the number of protection pixels associated with each reference pixel, and Q is an integer greater than 1.

Figure 5:
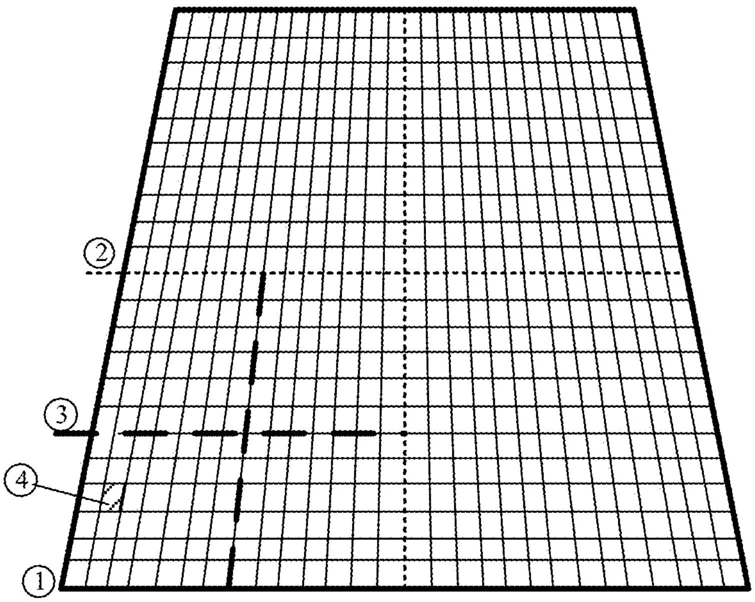
FIG. 5 is a schematic diagram of another method for displaying a virtual landscape picture according to an embodiment of the present application.

For example, the landscape layer index map and the weight map can be represented in a grid diagram illustrated in FIG. 5. Each grid illustrated in FIG. 5 may correspondingly identify a pixel in the landscape layer index map or a pixel in the weight map. Here, each grid can correspondingly identify M*M display pixels in the virtual landscape picture, such as 7*7 display pixels. The foregoing descriptions are both examples. This is not limited in this embodiment.

The bold solid line (1) in FIG. 5 is used for representing a terrain object (also known as landscape actor), which includes all terrain contents in a scene. The dotted lines (2) in FIG. 5 divide the terrain object to obtain four landscape components. Usually, during rendering, a landscape component submits a draw call. In other words, a landscape component is a rendering unit. The contents involved in different landscape components do not affect each other in rendering. For example, when a landscape component only renders snow land, and another landscape component only renders grass land, the landscape component that renders grass land can completely not process rendering resources (snow land map resources, etc.) required for rendering snow land, and vice versa. The bold line segments 3 in FIG. 5 divide the landscape component to obtain four sections. In addition, each grid 4 in FIG. 5 is used for identifying a quad, that is, a pixel, for fine positioning.

Figure 6:
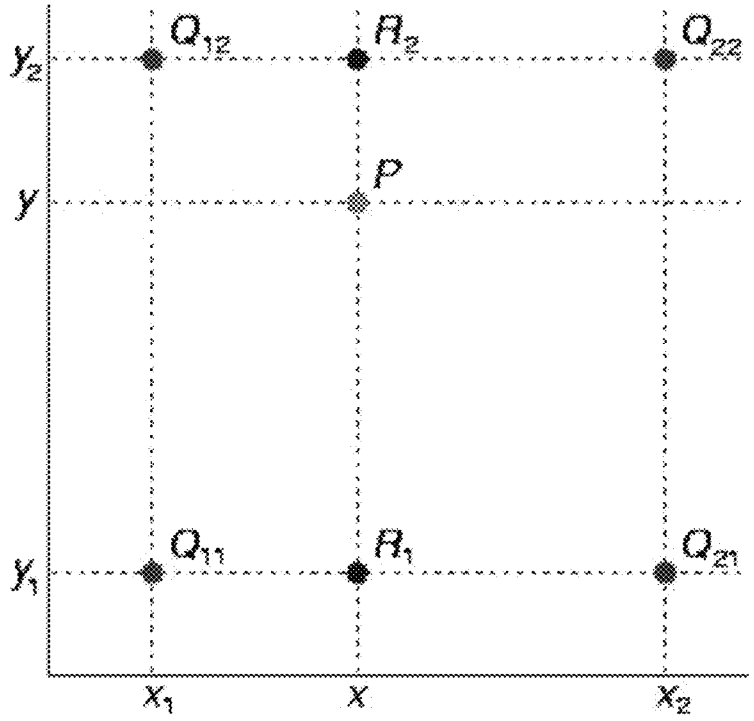
FIG. 6 is a schematic diagram of a yet another method for displaying a virtual landscape picture according to an embodiment of the present application.

In some embodiments, in the process of performing picture rendering based on the landscape layer index map and the weight map, the Graphics Processing Unit (GPU), as the execution subject, is designed with a function of automatic interpolation. During rasterizing, it will perform interpolation and smooth transition on adjacent pixels, by, but not limited to, using a bilinear interpolation algorithm. Assuming that a coordinate system (abscissa is x and ordinate is y) is constructed in the source image to be processed, as illustrated in FIG. 6, in the bilinear interpolation algorithm, the value of R1 is calculated based on the weighted average of the values of Q11 (coordinates are (x1, y1)) and Q21 (coordinates are (x2, y1)), and then the value of R2 is calculated based on the weighted average of the values of Q12 (coordinates are (x1, y2)) and Q22 (coordinates are (x2, y2)). Finally, the value of point P (coordinates are (x, y)) is calculated by using the weighted average of the values of R1 and R2. Here, the image quality after interpolation processing is high, and there is no discontinuity in pixel values.

Figure 7:
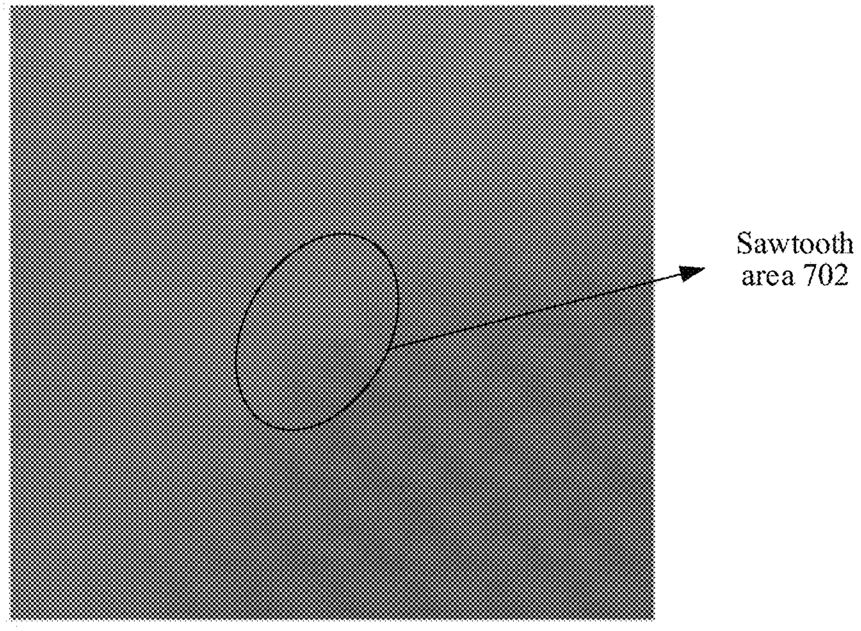
FIG. 7 is a schematic diagram of a yet another method for displaying a virtual landscape picture according to an embodiment of the present application.

However, after the GPU directly performs real interpolation according to the linear interpolation algorithm, the effect after rendering will present a sawtooth area 702 as illustrated in FIG. 7, thus distorting the rendered virtual landscape picture.

Figure 8:
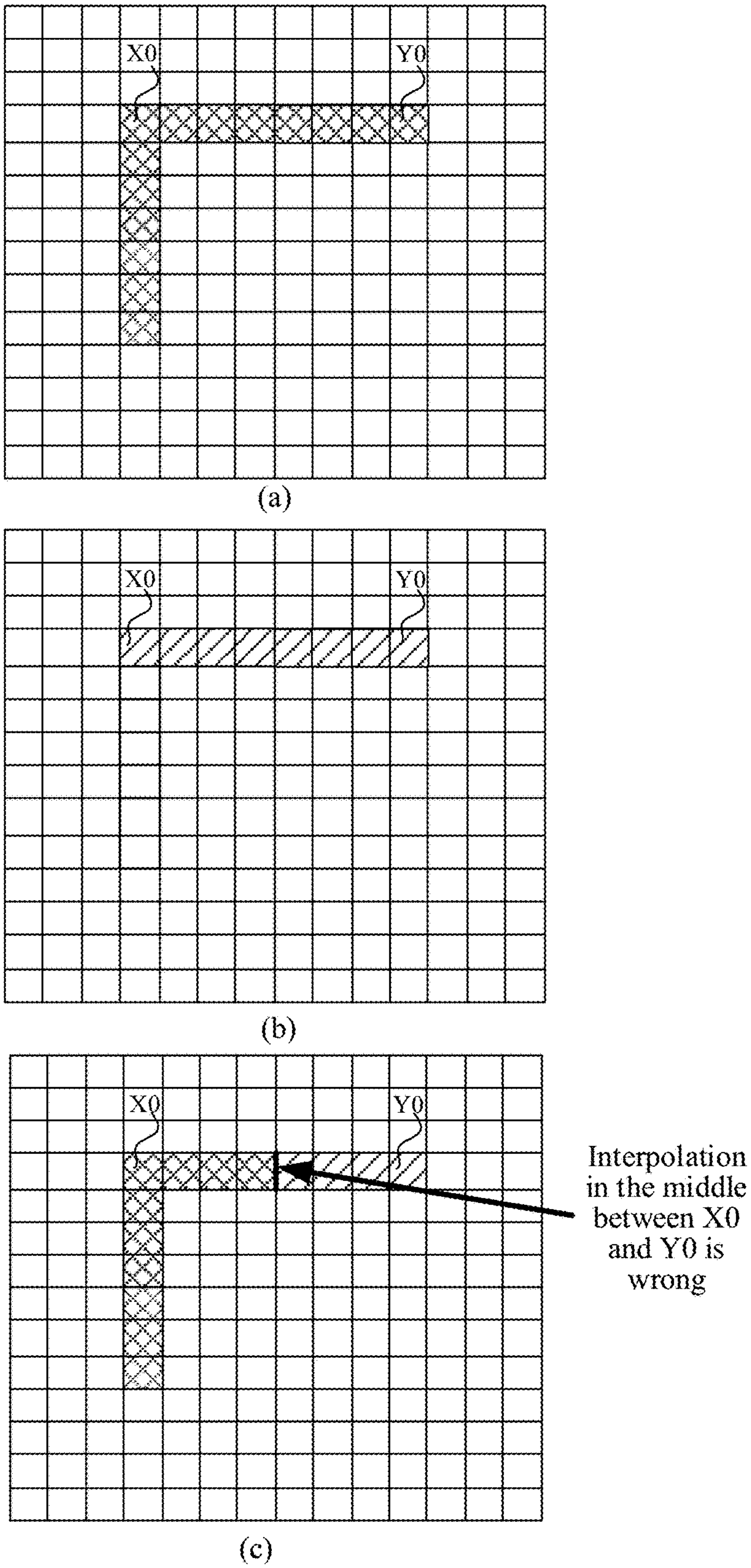
FIG. 8 is a schematic diagram of a yet another method for displaying a virtual landscape picture according to an embodiment of the present application.

The reason for the sawtooth display problem will be explained in combination with the content illustrated in FIG. 8. FIG. 8 is a grid diagram corresponding to the weight map. It is assumed that, as illustrated in FIG. 8 (*a*), a first group of pixels filled with grid lines associated with reference pixel X0 is used for representing the landscape layer of grass land, and as illustrated in FIG. 8 (*b*), a second group of pixels filled with oblique lines associated with reference pixel Y0 is used for representing the landscape layer of soil land. When the two landscape layers meet, direct interpolation between different landscape layers will result in an obvious and stiff transition boundary (indicating the position where the interpolation is wrong) as illustrated in FIG. 8 (*c*), so that the display effect of the sawtooth area will appear during rendering. For example, when Y0 is a grass land, that is, the weight of soil land of Y0 is 0, as the GPU performs interpolation and interpolates to the middle of X0 and Y0, the weight of the soil land is 0.5, and the weight of the corresponding grass land is 0.5. Since the grass land and the soil land do not belong to the same kind of land, it is of no practical significance to merge the land with weight of 0.5 and the grass land with weight of 0.5. Therefore, it will have to make a rough transition at this position, thus producing the display effect of the sawtooth area.

Figure 9:
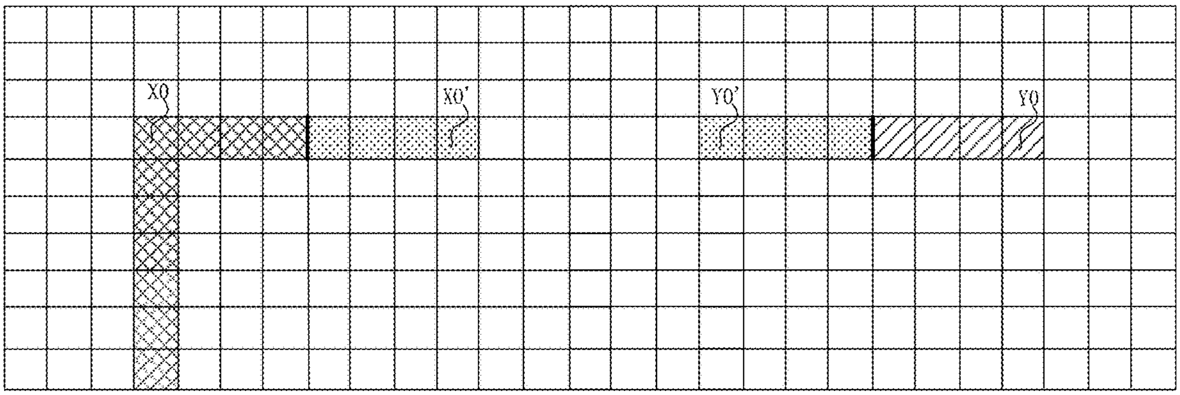
FIG. 9 is a schematic diagram of a yet another method for displaying a virtual landscape picture according to an embodiment of the present application.

In order to overcome the problem, in this embodiment, protection pixel is set for reference pixel in the weight map. Here, the positions of the protection pixel and the reference pixel may be, but not limited to, symmetrical, and the reference weight stored in the protection pixel may be, but not limited to, a negative value of the target display weight stored in the reference pixel. For example, also taking the two landscape layers assumed above as an example, as illustrated in FIG. 9, protection pixel X0' is set for reference pixel X0 and protection pixel Y0' is set for reference pixel Y0. It is assumed that X0=[1], indicating that the landscape layer is grass land, and X0'=[−1], indicating that the landscape layer is negative grass land. It is assumed that Y0=[2], indicating that the landscape layer is soil land, and Y0'=[−2], indicating that the landscape layer is negative soil land. This is only for description and representation, and has no practical significance. When the GPU is controlled to perform linear interpolation in the above manner, comprehensive consideration may be made in combination with the protection element to avoid the obvious rigid transition boundary illustrated in FIG. 8 (*c*).

Figure 10:
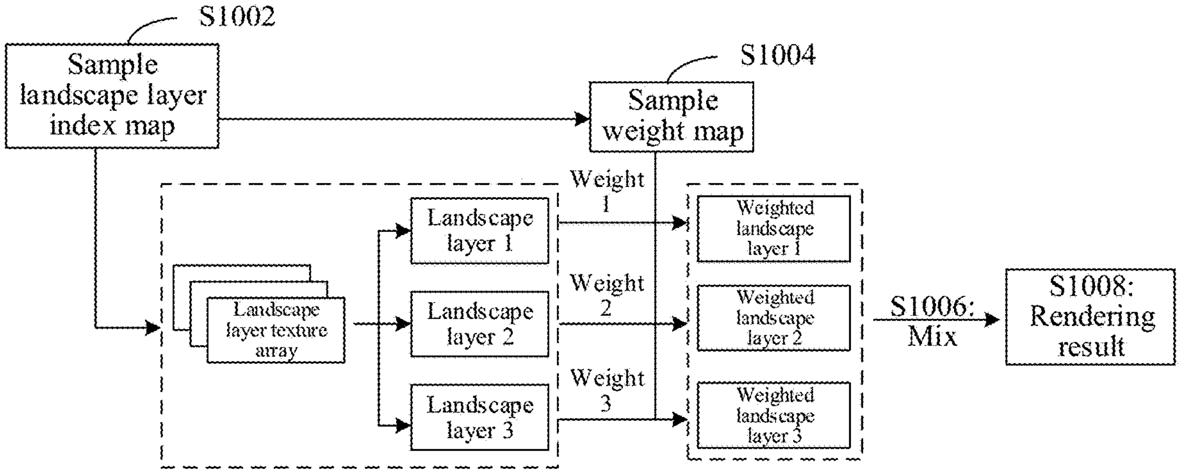
FIG. 10 is a flowchart of another method for displaying a virtual landscape picture according to an embodiment of the present application.

Specifically, description is made with reference to FIG. 10. In step S1002, sampling is performed to obtain a landscape layer index map. In step S1004, sampling is performed to obtain a weight map matching the landscape layer index map. Each image color channel of the landscape layer index map is used for storing an index value (also referred to as subscript) of each landscape layer recorded in a texture array. As illustrated in the figure, the corresponding subscript indexes of landscape layer 1 to landscape layer 3 are stored. A display weight corresponding to each landscape layer and a reference weight of the associated protection pixel are stored in each image color channel of the weight map. For example, the weight 1 corresponding to the landscape layer 1 is stored in the image color channel corresponding to the corresponding weighted landscape layer 1 of the weight map. The weighted landscape layer 2 and the weighted landscape layer 3 are processed in the same manner.

Then, in steps S1006-S1008, the above information is mixed, and rendering is performed according to a mixing result to obtain a rendering result, that is, a virtual landscape picture corresponding to a landscape area to be rendered.

Each pixel in each image color channel in the landscape layer index map is used for storing an index value of one landscape layer in a texture array. For example, the R value (R image color channel) in the first pixel in the landscape layer index map may be 0, and the B value (B image color channel) may be 2. Each reference pixel in each image color channel in the weight map is used for storing a target display weight. For example, the R value (R image color channel) in the first reference pixel in the weight map may be 50%, and the B value (B image color channel) may be 20%, so that the terminal can determine the landscape layer corresponding to 0 and the landscape layer corresponding to 2 based on the texture array during picture rendering, multiply the landscape layer corresponding to 0 by the corresponding target display weight 50% to obtain a weighted landscape layer 1, multiply the landscape layer corresponding to 2 by the target display weight 20% to obtain a weighted landscape layer 2, mix the weighted landscape layer 1 and the weighted landscape layer 2 to obtain a virtual landscape picture.

The foregoing descriptions shown in FIG. 10 are both examples. This is not limited in this embodiment.

In this embodiment, two maps, i.e., the landscape layer index map and the weight map are used for replacing one map commonly used in the related technologies. The information corresponding to different types of landscape layers for rendering and display is recorded and stored by using each image color channel of each pixel in the two maps, and it is not limited by sampling, thus simplifying the rendering and display operation of the highly complex virtual landscape picture, and avoiding the problem of complicated display operation of the virtual landscape picture due to the increase in the number of times of sampling because of the increase in the number of landscape layers.

In some embodiments, acquiring the weight map matching the landscape layer index map includes for each image color channel of the landscape layer index map, sequentially determining a protection pixel matching each pixel in the image color channel in each direction and determining the reference weight corresponding to each protection pixel to generate the weight map.

Figure 11:
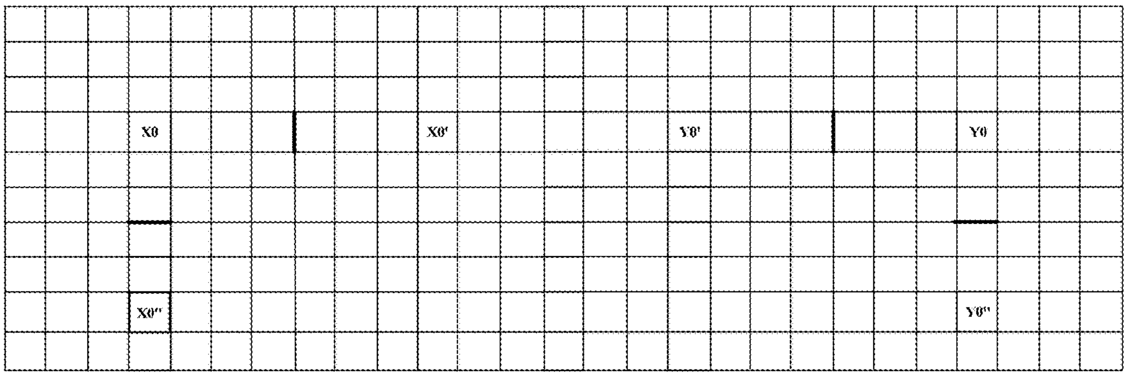
FIG. 11 is a schematic diagram of a yet another method for displaying a virtual landscape picture according to an embodiment of the present application.

It is to be understood that, in this embodiment, the protection pixel matching each pixel in the landscape layer index map in each direction may include, but not limited to, protection pixels matched in each positive direction of each pixel, such as upward direction, downward direction, left side and right side. For example, as illustrated in FIG. 11, a protection pixel X0' is generated on the right side of the reference pixel X0, and a protection pixel X0" is generated in the downward direction of the reference pixel X0; a protection pixel Y0' is generated on the left side of the reference pixel Y0, and a protection pixel Y0" is generated in the downward direction of the reference pixel Y0.

Figures 12, 13:
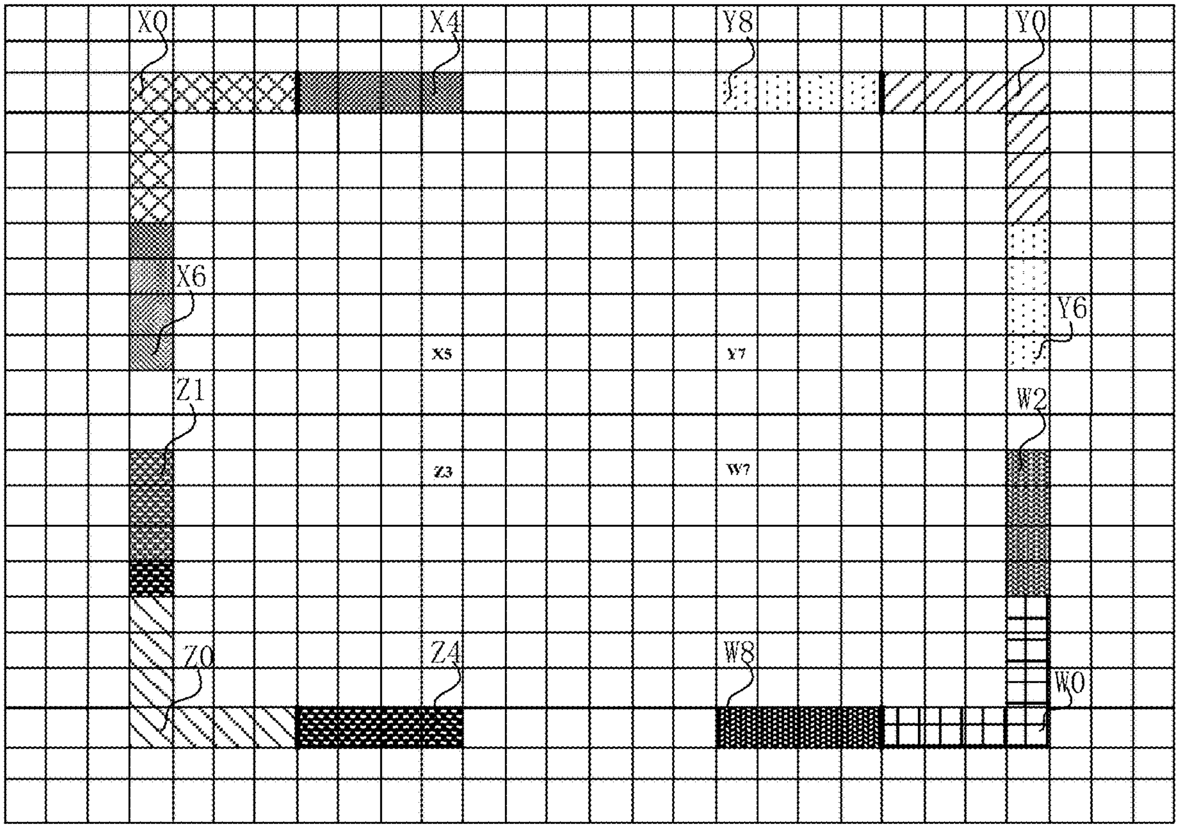
FIG. 12 is a schematic diagram of a yet another method for displaying a virtual landscape picture according to an embodiment of the present application.
FIG. 13 is a schematic diagram of a yet another method for displaying a virtual landscape picture according to an embodiment of the present application.

Moreover, in this embodiment, the protection pixel matching each pixel in the landscape layer index map in each direction may include, but not limited to, protection pixels matched in each oblique direction of each pixel, such as right oblique upward direction, left oblique upward direction, right oblique downward direction and left oblique downward direction. For example, it is assumed that the weight map includes a reference pixel X0, a reference pixel Y0, a reference pixel Z0, and a reference pixel W0. Protection pixels X1 to X8 (X4 to X8 are illustrated in FIG. 12) will be generated in each direction of the reference pixel X0, protection pixels Y1 to Y8 (Y4 to Y8 are illustrated in FIG. 12) will be generated in each direction of the reference pixel Y0, protection pixels Z1 to Z8 (Y1 to Y8 are illustrated in FIG. 12) will be generated in each direction of the reference pixel Z0, and protection pixels W1 to W8 (W1 to W8 are illustrated in FIG. 12) will be generated in each direction of the reference pixel W0.

By generating the protection pixels, the GPU can perform linear interpolation processing through the protection pixels in subsequent picture rendering, so that the transition between the landscape layers after rendering through linear interpolation can be smoother.

In this embodiment, for the landscape layer corresponding to each image color channel of the landscape layer index map, a pixel cluster and display weight cluster corresponding to each landscape layer in the weight map are sequentially determined to generate a weight map used for rendering. The two maps, i.e., the landscape layer index map and the weight map are used for rendering the highly complex virtual landscape picture corresponding to the target landscape area, thus overcoming the problem of complicated rendering and display operation caused by the increase of times of sampling with the increase of the number of landscape layers, and improving the rendering efficiency.

In some embodiments, sequentially determining the protection pixel matching each pixel in the image color channel in each direction and determining the reference weight corresponding to each protection pixel in the landscape layer index map to generate the weight map includes:

for each image color channel of the landscape layer index map, sequentially repeating the following steps until each pixel in the landscape layer index map is traversed:

S1: determining a current pixel pair from the landscape layer index map, wherein the current pixel pair includes a first current pixel and a second current pixel; and S2: determining a first reference weight of a first protection pixel of the first current pixel in a first direction and a second reference weight of a second protection pixel of the second current pixel in a second direction based on a linear interpolation algorithm, wherein the first direction and the second direction are opposite directions, and an average value of the target display weight of the first current pixel and the first reference weight of the first protection pixel is equal to an average value of the target display weight of the second current pixel and the second reference weight of the second protection pixel.

It is to be understood that the current pixel pair here may be a pixel pair in any direction. Description will be made by taking a pixel pair in one direction as an example. Specifically, description will be made in combination with the example illustrated in FIG. 9.

It is assumed that a reference pixel corresponding to the landscape layer index map in the weight map includes a current pixel pair including a reference pixel X0 (i.e., first current pixel) and a reference pixel Y0 (i.e., second current pixel). A protection pixel X0' is generated on a right side (i.e., first direction) of the reference pixel X0. A protection pixel Y0' is generated on a left side (i.e., second direction) of the reference pixel Y0. The first current pixel is a sub-pixel of a pixel in the landscape layer index map. For example, when a pixel in the landscape layer index map corresponds to 7*7 display pixels in a virtual landscape picture. In a case that it corresponds to 7*7 pixels in a landscape texture map, the first current pixel may be 1 pixel in 7*7 pixels. Correspondingly, the second current pixel may be 1 pixel of 7*7 pixels. It is easy to understand that, during linear interpolation, the GPU performs linear interpolation processing for each sub-pixel in each pixel in the landscape layer index map, that is, performs linear interpolation processing for each pixel included in each quad.

A reference weight (identified as X0') of the protection pixel X0' and a reference weight (identified as Y0') of the protection pixel Y0' are determined based on the bilinear interpolation algorithm. The formulas are as follows:

$$AVG(X0+XO')=AVG(Y0+Y0') \tag{1}$$

$$X0'=AVG-X0 \tag{2}$$

$$Y0'=AVG-Y0 \tag{3}$$

By setting that an average value of the target display weight of the first current pixel and the first reference weight of the first protection pixel is equal to an average value of the target display weight of the second current pixel and the second reference weight of the second protection pixel, the weight in the middle of the pixel pair that can be calculated can be 0 during the subsequent linear interpolation based on the protection pixel, so that 0 weight reduces the occurrence of sawtooth. For example, referring to FIG. 9, by setting the two average values to be equal, the weight in the middle of X0 and Y0 can be 0 after linear interpolation, thus achieving the purpose of smooth transition based on 0 weight.

In an embodiment, the method further includes: for each group of adjacent pixels in the landscape layer index map, determining a pixel cluster corresponding to a first adjacent pixel in a current group of adjacent pixels and determining a pixel cluster corresponding to a second adjacent pixel in the current group of adjacent pixels; taking the pixel cluster corresponding to the first adjacent pixel as a first pixel cluster and taking the pixel cluster corresponding to the second adjacent pixel as a second pixel cluster; performing linear interpolation processing on the current group of adjacent pixels according to the target display weight of the reference pixel in the first pixel cluster, the reference weight of the protection pixel in the first pixel cluster, the target display weight of the reference pixel in the second pixel cluster and the reference weight of the protection pixel in the second pixel cluster to obtain a transition weight; and performing smooth transition rendering on the current group of adjacent pixels according to the transition weight. Displaying the virtual landscape picture corresponding to the target landscape area includes displaying the virtual landscape picture corresponding to the target landscape area according to a picture rendering result and a smooth transition rendering result.

In the process of performing picture rendering based on the landscape layer index map and the weight map, the Graphics Processing Unit (GPU), as the execution subject, is designed with a function of automatic interpolation. During rasterizing, it will perform interpolation and smooth transition on adjacent pixels by using the linear interpolation algorithm. For each group of adjacent pixels in the landscape layer index map, a pixel cluster corresponding to a first adjacent pixel in a current group of adjacent pixels is determined from the weight map, a pixel cluster corresponding to the first adjacent pixel is taken as a first pixel cluster, a pixel cluster corresponding to a second adjacent pixel in the current group of adjacent pixels is determined from the weight map, and a pixel cluster corresponding to the second adjacent pixel is taken as a second pixel cluster. A group of adjacent pixels may include a first adjacent pixel and a second adjacent pixel. For example, the pixel of the first order and the pixel of the second order in the landscape layer index map may be called a group of adjacent pixels. The pixel of the first order may be the first adjacent pixel and the pixel of the second order may be the second adjacent pixel. Since each pixel in the landscape layer index map has a mapping relationship with a pixel cluster in the weight map, the GPU can determine the first pixel cluster and the second pixel cluster according to the mapping relationship. Further, the first pixel cluster and the second pixel cluster may each include a reference pixel and a protection pixel. Therefore, when the GPU performs linear interpolation on the first adjacent pixel and the second adjacent pixel, it can perform interpolation processing according to the target display weight of the reference pixel and the reference weight of the protection pixel to obtain a transition weight for rendering a connection area between the first adjacent pixel and the second adjacent pixel. A pixel in the landscape layer index map can be considered as a quad, and a quad can correspondingly identity 7*7 display pixels in the virtual landscape picture (texture map). For example, referring to FIG. 11, the 7*7 grids in the weight map can correspond to a pixel in the landscape layer index map, that is, to a quad. When X0=[1], it indicates that the weight of the landscape layer which is grass land is 1; when X0'=[−1], it indicates that the weight of the landscape layer which is grass land is −1, that is, it is negative grass land. When Y0=[2], it indicates that the weight of the landscape layer which is soil land is 1; when Y0'=[−2], it indicates that the landscape layer is negative soil land. When the GPU performs linear interpolation, the GPU can first determine X0 as grass land and Y0 as soil land. Since Y0 is soil land, that is, the grass land weight of Y0 is 0, when the GPU performs interpolation processing on X0, the determined grass land weight in the middle of X0 and Y0 is (1+0)/2=0.5. When the GPU performs interpolation on Y0, the determined soil land weight in the middle of X0 and Y0 is (2+0)/2=1. When the GPU performs interpolation on X0', the determined grass land weight in the middle of X0 and Y0 is (−1+0)/2=−0.5. When the GPU performs interpolation on Y0', the determined soil land weight in the middle of X0 and Y0 is (−2+0)/2=−1 0.5, 1, −0.5 and −1 are transition weights, X0 and Y0 are reference pixels, and X0 'and Y0' are protection pixels.

Further, when the transition weight is determined, the GPU can perform rendering on a connection area between the first adjacent pixel and the second adjacent pixel according to the transition weight. For example, the grass land with the transition weight of 0.5, the soil land with the transition weight of 1, the grass land with the transition weight of −0.5 and the soil land with the transition weight of −1 can be mixed in the middle of X0 and Y0 to perform smooth transition rendering and obtain a smooth transition rendering result. The terminal displays the virtual landscape picture corresponding to the target landscape area comprehensively according to the picture rendering result and the smooth transition rendering result.

In an embodiment, since there may be a plurality of image color channels in the landscape layer index map, the R & D personnel can specify the image color channel for linear interpolation. For example, when the R channel in the pixel of the first order in the landscape layer index map points to grass land and the B channel in the pixel of the second order points to soil land, the R & D personnel may specify to perform linear interpolation on the R channel in the pixel of the first order and the B channel in the pixel of the second order. Therefore, the GPU can perform linear interpolation processing based on the target display weight and the reference weight in the R channel in the first pixel cluster and the target display weight and the reference weight in the B channel in the second pixel cluster in the weight map, to perform smooth transition on the grass land and the soil land.

Since interpolation processing can be performed through the protection pixel, smooth transition can be performed on the landscape layer pointed to by the adjacent pixels in the landscape layer index map to ensure the authenticity of the virtual landscape picture.

In some embodiments, after the first reference weight of the first protection pixel of the first current pixel in the first direction and the second reference weight of the second protection pixel of the second current pixel in the second direction are determined based on the linear interpolation algorithm, the method further includes S3: determining a third current pixel associated with the first current pixel and a fourth current pixel associated with the second current pixel in the landscape layer index map; and S4: determining a first oblique reference weight of a first oblique protection pixel of the first current pixel in a first oblique direction based on the linear interpolation algorithm; determining a second oblique reference weight of a second oblique protection pixel of the second current pixel in a second oblique direction based on the linear interpolation algorithm; determining a third oblique reference weight of a third oblique protection pixel of the third current pixel in a third oblique direction based on the linear difference algorithm; and determining a fourth oblique reference weight of a fourth oblique protection pixel of the fourth current pixel in a fourth oblique direction based on the linear interpolation algorithm, wherein an average value of the target display weight of the first current pixel, the target display weight of the second current pixel, the target display weight of the third current pixel and the target display weight of the fourth current pixel is equal to an average value of the first oblique reference weight, the second oblique reference weight, the third oblique reference weight and the fourth oblique reference weight.

Specifically, description will be made in combination with the example illustrated in FIG. 13.

It is assumed that the weight map includes a reference pixel X0, a reference pixel Y0, a reference pixel Z0, and a reference pixel W0. As illustrated in FIG. 13, a protection pixel X4 is generated on the right side of the reference pixel X0, and a protection pixel X6 is generated in the downward direction of the reference pixel X0; a protection pixel Y8 is generated on the left side of the reference pixel Y0, and a protection pixel Y6 is generated in the downward direction of the reference pixel Y0; a protection pixel Z4 is generated on the right side of the reference pixel Z0, and a protection pixel Z2 is generated in the upward direction of the reference pixel Z0; a protection pixel W8 is generated on the left side of the reference pixel W0, and a protection pixel W2 is generated in the upward direction of the reference pixel W0.

Based on the protection pixels, the reference weights corresponding to the protection pixels X5, Y7, Z3 and W1 can be obtained. Since the protection pixels are finally folded, when the GPU analyzes any pixel, it will consider that these protection pixels are actually a value MidR. Here, according to the bilinear interpolation algorithm, the following can be obtained:

$$MidR = AVG(X0 + Y0 + Z0 + W0) \tag{4}$$

Figure 14:
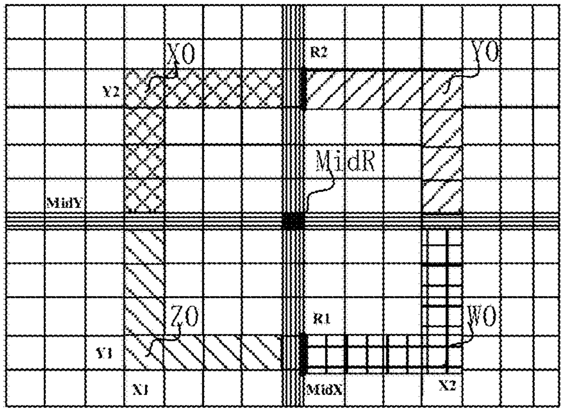
FIG. 14 is a schematic diagram of a yet another method for displaying a virtual landscape picture according to an embodiment of the present application.

That is, the value of MidR is an average value of the four reference pixels (X0, Y0, Z0, and W0). This means that, when the GPU performs interpolation on the position of MidR, the value obtained after interpolation is MidR. Due to the existence of the protection pixels, the MidR calculated by the GPU in the real interpolation to the middle is equivalent to the center position of four reference pixels. That is, the center position illustrated in FIG. 14 is MidR. AVG represents averaging operation.

$$\begin{aligned} MidR = AVG(X0 + X4 + X6 + X5) = \\ AVG(Y0 + Y6 + Y7 + Y8) = AVG(Z0 + Z2 + Z3 + Z4) = \\ AVG(W0 + W1 + W2 + W8) = AVG(X0 + Y0 + Z0 + W0) \end{aligned} \tag{5}$$

Based on the above formula (5), the oblique protection pixels will be determined:

$$X5 = AVG*4 - (X0 + X4 + X6);$$

$$Y7 = AVG*4 - (Y0 + Y6 + Y8);$$

$$Z3 = AVG*4 - (Z0 + Z2 + Z4);$$

$$W1 = AVG*4 - (W0 + W2 + W8).$$

In this embodiment, the protection pixels of the reference pixel in each direction are determined to generate the weight map used for rendering, so that the rendering and display efficiency can be improved by using the two maps, i.e., the landscape layer index map and the weight map. Further, the protection pixels here will also be used for assisting in smooth transition to ensure the authenticity of the virtual landscape picture.

In some embodiments, performing filtering calculation on each pixel cluster in the weight map to skip the protection pixel and obtain the target display weight corresponding to the pixel in the landscape layer index map includes:

S1: compressing on the weight map according to a target ratio, wherein the target ratio is determined according to a resolution ratio of the landscape layer index map to the weight map; and S2: acquiring a target mapping formula, and inputting display coordinates in the compressed weight map into the target mapping formula for calculation to skip the protection pixel and obtain the target display weight corresponding to the pixel in the landscape layer index map.

Since the protection pixels are set in each direction corresponding to the reference pixel, the resolution of the weight map in which the protection pixels are stored can be N times that of the landscape layer index map. For example, referring to FIG. 13, the resolution of the weight map in which the protection pixels are stored is three times larger than that of the landscape layer index map. When the terminal performs picture rendering, the terminal can perform compression processing on the weight map according to the target ratio, and input display coordinates in the compressed weight map into the target mapping formula for calculation to skip the protection pixel and obtain the target display weight corresponding to the pixel in the landscape layer index map. The display coordinates are used for indicating the position of the pixel in the compressed weight map.

Since the protection pixels are only used for GPU hardware to perform interpolation processing, when picture rendering is performed by software, for example, when rendering is performed on the landscape layer pointed to by the pixel in the landscape layer index map, the protection pixels can be skipped and only the reference pixel in the pixel cluster can be used for rendering. For example, picture rendering is performed only based on the target display weight of the reference pixel in the weight map, rather than that picture rendering is performed according to the reference weight of the protection pixel. In this way, it is possible to render each quad through the reference pixel, and smooth transition processing can be performed on adjacent quads through the protection pixels. Therefore, the authenticity of the virtual landscape picture is further improved.

In some embodiments, inputting display coordinates in the compressed weight map into the target mapping formula for calculation to skip the protection pixel and obtain the target display weight corresponding to the pixel in the landscape layer index map includes: acquiring a reference parameter value associated with the target ratio; performing rounding processing on the display coordinates in the compressed weight map based on the reference parameter value to obtain a first intermediate value; perform remainder-taking processing on the display coordinates in the compressed weight map based on the reference parameter value to obtain a second intermediate value; determining the target display weight obtained after skipping the protection pixel based on the first intermediate value and the second intermediate value.

It is to be understood that the reference weight values in the protection pixels cannot really be displayed in the final landscape calculation, so such values need to be skipped when sampling the weight map. In some embodiments, the resolution of the weight map is Q times the resolution of the landscape layer index map, and the reference parameter value here may be, but not limited to, Q. Further, the protection pixels can be skipped by, but not limited to, the following formulas:

$$X = \text{Index } MapUV * WeightMap\ TexSize \tag{6}$$

$$WeightMapUVResult = (\text{floor}(X/3) * 3 + 1 + (X\ \%3)/3)/3)/ \quad WeightMap\ TexSize \tag{7}$$

Figure 15:
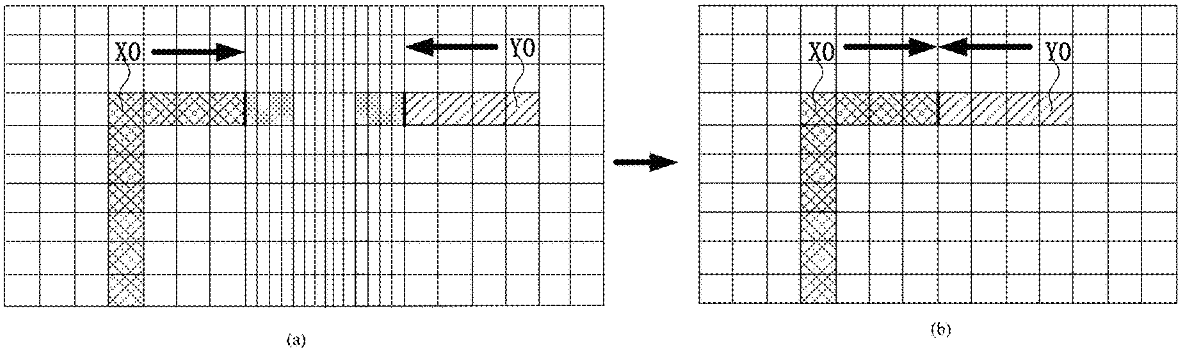
FIG. 15 is a schematic diagram of a yet another method for displaying a virtual landscape picture according to an embodiment of the present application.

Formula (6) is used for compressing each pixel in the weight map so that the protection pixels are compressed into the reference pixel, as illustrated in FIG. 15 (*a*)-(*b*). Formula (7) is used for performing jump processing between the compressed reference pixels, so that the process directly jumps to the processing of the next reference pixel after the current reference pixel, without processing the value in the protection pixel. Index Map UV refers to the abscissa and ordinate values of the pixel in the landscape layer index map, which may be the coordinate values in the coordinate system established with the lower left corner of the landscape layer index map as the origin. WeightMap TexSize refers to the pixel size of the weight map. WeightMapUVResult refers to the abscissa and ordinate values of the pixel in the weight map, which may be the coordinate values in the coordinate system established with the lower left corner of the weight map as the origin. Floor is a rounding-down function. Here, floor(X/3) is the first intermediate value and (X % 3) is the second intermediate value. The WeightMapUVResult calculated through the first intermediate value and the second intermediate value is the position coordinate of the reference pixel in the weight map, so that the terminal can read the pixel value of the pixel at this position coordinate, and the read pixel value is the target display weight of the reference pixel in the weight map.

In an embodiment, when rendering is performed by software, the landscape layer index map stores three pixels a, b and c, and the weight map stores nine pixels a1, a2, a3, b1, b2, b3, c1, c2 and c3. The terminal can perform sampling on the landscape layer index map and the weight map at the same time to perform picture rendering based on the sampling result. For example, during first sampling, the terminal may determine the current sampled pixel a in the landscape layer index map, and determine the current sampled pixel a1 in the landscape layer index map through the target mapping formula, and perform picture rendering based on the landscape layer texture map pointed to by a1 and a. Further, during second sampling, the terminal may determine the current sampled pixel b in the landscape layer index map, and determine the current sampled pixel b1 in the landscape layer index map through the target mapping formula (at this time, the two protection pixels a2 and a3 are skipped), and perform picture rendering based on the landscape layer texture map pointed to by b1 and b. And so on until the whole target landscape area is successfully rendered.

Figure 16:
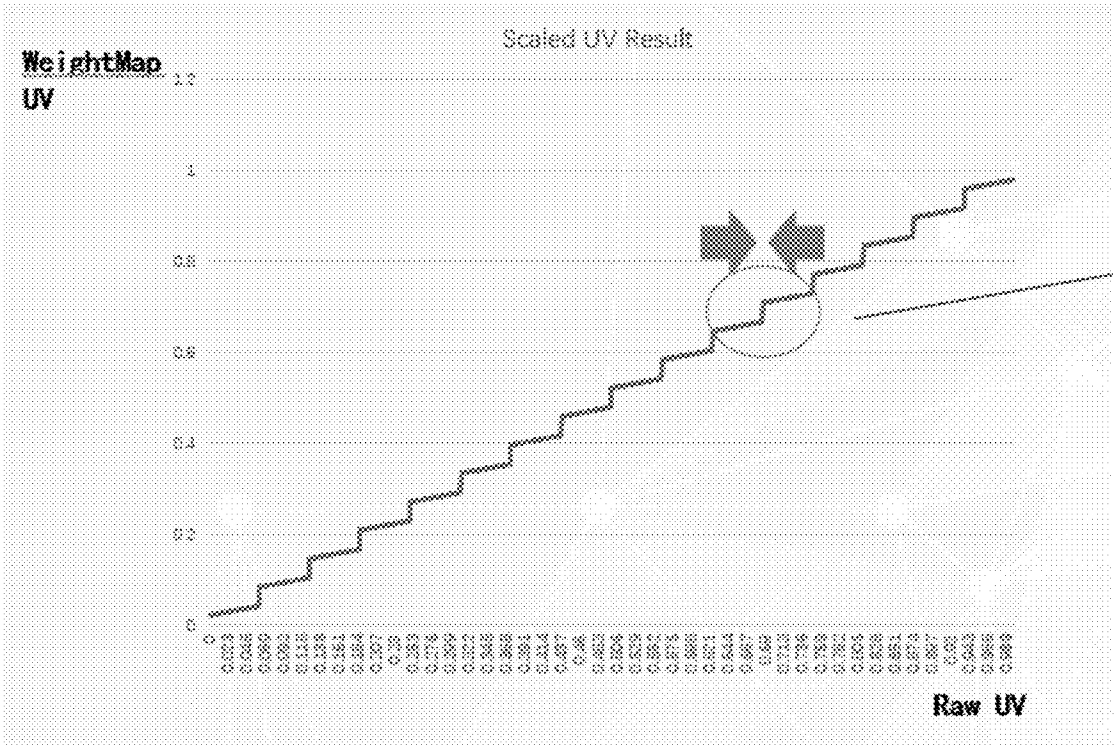
FIG. 16 is a schematic diagram of a yet another method for displaying a virtual landscape picture according to an embodiment of the present application.

After skipping the protection pixel of the weight map in the above manner, the processing result of the GPU will be, as illustrated in FIG. 16, a broken line diagram. The value of the abscissa rises in a vertical line, as if the value of part Y is skipped, and the skipped part is the protection pixel.

In this embodiment, the target display weight corresponding to the pixel in the landscape layer index map recorded in the reference pixel is obtained by skipping the protection pixel in the weight map. Therefore, the protection pixel is prevented from interfering with the rendering and display.

In some embodiments, acquiring the landscape layer index map corresponding to the target landscape area to be displayed currently includes:

S1: acquiring a plurality of landscape layer types included in the target landscape area to be displayed currently and determining a type weight corresponding to each landscape layer type in the plurality of landscape layer types; and S2: screening at least one target landscape layer type with a corresponding type weight which satisfies a preset condition from the plurality of landscape layer types, and acquiring an index value of a landscape layer corresponding to each of the screened at least one target landscape layer type; sequentially storing the index value in each image color channel of the landscape layer index map to obtain the landscape layer index map corresponding to the target landscape area to be displayed currently. The value of the type weight may be the weight value of the reference weight.

Figure 17:
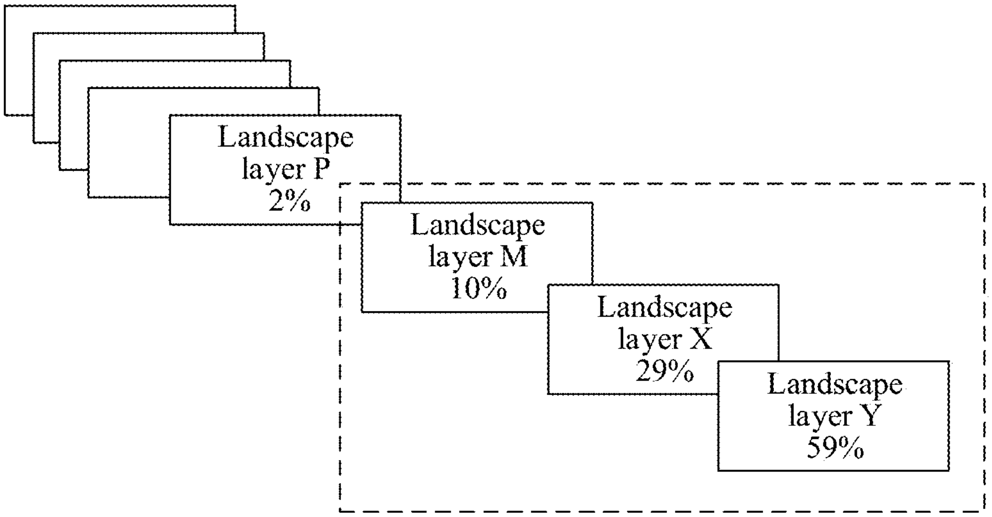
FIG. 17 is a schematic diagram of a yet another method for displaying a virtual landscape picture according to an embodiment of the present application.

The preset condition can be set freely according to the demand. For example, for some landscape areas (such as roads) with a large number of layers, the human visual effect can be taken into consideration, and the landscape layer with a higher perceptual weight can be selected from the plurality of landscape layer types preset for the target landscape area to be displayed currently. For example, as illustrated in FIG. 17, it is assumed that 3 values are stored in the landscape layer index map. Here, the first 3 landscape layers with large weights (as illustrated in the figure, landscape layer Y with a weight of 59%, landscape layer X with a weight of 29% and landscape layer M with a weight of 10%) are selected according to the weight of the landscape layer, and their subscripts (i.e., index values) are stored in the landscape layer index map.

For another example, landscape layer types with perceptual weights greater than a preset weight threshold may be randomly selected from the plurality of set landscape layer types, and the index values corresponding to the randomly selected landscape layer types are stored in the landscape layer index map.

In this embodiment, the landscape layers are screened by selection, thus ensuring that the landscape layers within the visual range of human eyes are stored in the landscape layer index map, rather than that all the landscape layer information is stored, avoiding resource waste and reducing the rendering load.

In some embodiments, screening at least one target landscape layer type with the corresponding type weight which satisfies the preset condition from the plurality of landscape layer types, and acquiring the index value of the landscape layer corresponding to each of the screened at least one target landscape layer type include: performing type weight ranking according to the size of the type weights of the plurality of landscape layer types, and acquiring index values of landscape layers corresponding to first N landscape layer types according to a ranking result of the type weights.

The terminal determines a plurality of preset landscape layer types, and determines a type weight corresponding to each landscape layer type, ranks the plurality of landscape layer types according to the type weights from large to small, and obtains a ranking result. The terminal acquires the first N landscape layer types according to the ranking result, and stores the index values of the obtained first N landscape layer types in each image color channel of the landscape layer index map to obtain the landscape layer index map. N may be freely set according to the demand.

It is to be understood that, for ease of description, the foregoing method embodiments are represented as a series of action combinations, but a person skilled in the art is to learn that the present application is not limited to the described order of the actions because some steps may be performed in another order or performed simultaneously according to the present application. In addition, a person skilled in the art is also to appreciate that all the embodiments described in the specification are preferred embodiments, and the related actions and modules are not necessarily mandatory to the present application.

Figure 18:
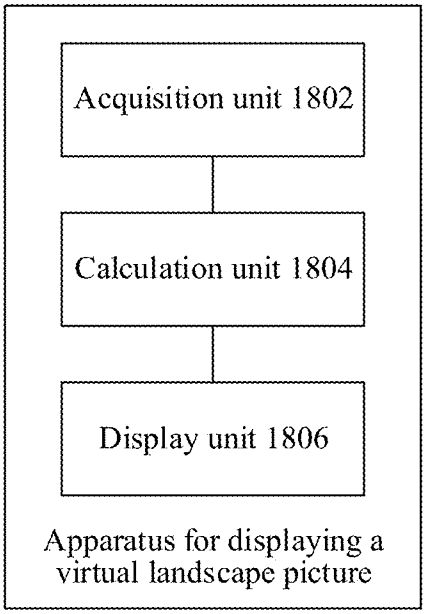
FIG. 18 is a schematic structural diagram of an apparatus for displaying a virtual landscape picture according to an embodiment of the present application.

Another aspect of the embodiments of the present application further provides an apparatus 1800 for displaying a virtual landscape picture configured to implement the method for displaying the virtual landscape picture. Referring to FIG. 18, the apparatus includes:

1) an acquisition unit 1802 configured to acquire a landscape layer index map corresponding to a target landscape area to be displayed currently, and a weight map matching the landscape layer index map, wherein each pixel in each image color channel in the landscape layer index map is used for storing an index value of one landscape layer in a texture array, a display weight cluster of the one landscape layer is correspondingly stored in a pixel cluster in each image color channel of the weight map, the pixel cluster includes a reference pixel and a protection pixel matching the reference pixel, the reference pixel is a pixel having a mapping relationship with a pixel in the landscape layer index map, the protection pixel matching the reference pixel is a pixel having a positional association relationship with the reference pixel and representing a virtual landscape layer, and the display weight cluster includes a target display weight corresponding to the reference pixel and a reference weight corresponding to the protection pixel;
2) a calculation unit 1804 configured to perform filtering calculation on each pixel cluster in the weight map to skip the protection pixel and obtain the target display weight corresponding to the pixel in the landscape layer index map;
3) a display unit 1806 configured to perform picture rendering according to the landscape layer index map and the target display weight in the weight map to display the virtual landscape picture corresponding to the target landscape area.

In an embodiment, the display unit 1806 is further configured to, for each group of adjacent pixels in the landscape layer index map, determine a pixel cluster corresponding to a first adjacent pixel in a current group of adjacent pixels and determine a pixel cluster corresponding to a second adjacent pixel in the current group of adjacent pixels; taking the pixel cluster corresponding to the first adjacent pixel as a first pixel cluster and taking the pixel cluster corresponding to the second adjacent pixel as a second pixel cluster; performing linear interpolation processing on the current group of adjacent pixels according to the target display weight of the reference pixel in the first pixel cluster, the reference weight of the protection pixel in the first pixel cluster, the target display weight of the reference pixel in the second pixel cluster and the reference weight of the protection pixel in the second pixel cluster to obtain a transition weight; and performing smooth transition rendering on the current group of adjacent pixels according to the transition weight.

In an embodiment, the apparatus 1800 for displaying a virtual landscape picture further includes a map generation module 1808 configured to, for each image color channel of the landscape layer index map, sequentially determine a protection pixel matching each pixel in the image color channel in each direction and determine a reference weight corresponding to each protection pixel to generate a weight map.

In an embodiment, the protection pixel includes a first protection pixel and a second protection pixel, the reference weight of the first protection pixel is a first reference weight, and the reference weight of the second protection pixel is a second reference weight; the map generation module 1808 is further configured to, for each image color channel of the landscape layer index map, sequentially repeat the following steps until each pixel in the landscape layer index map is traversed: determining a current pixel pair from the landscape layer index map, wherein the current pixel pair includes a first current pixel and a second current pixel; and determining the first reference weight of the first protection pixel of the first current pixel in a first direction and the second reference weight of the second protection pixel of the second current pixel in a second direction based on a linear interpolation algorithm, wherein the first direction and the second direction are opposite directions, and an average value of the target display weight of the first current pixel and the first reference weight of the first protection pixel is equal to an average value of the target display weight of the second current pixel and the second reference weight of the second protection pixel.

In an embodiment, the protection pixel further includes a first oblique protection pixel, a second oblique protection pixel, a third oblique protection pixel and a fourth oblique protection pixel, the reference weight of the first oblique protection pixel is a first oblique reference weight, the reference weight of the second oblique protection pixel is a second oblique reference weight, the reference weight of the third oblique protection pixel is a third oblique reference weight, the reference weight of the fourth oblique protection pixel is a fourth oblique reference weight, and the map generation module 1808 is further configured to determine a third current pixel associated with the first current pixel and a fourth current pixel associated with the second current pixel in the landscape layer index map; determine the first oblique reference weight of the first oblique protection pixel of the first current pixel in a first oblique direction based on the linear interpolation algorithm; determine a second oblique reference weight of a second oblique protection pixel of the second current pixel in a second oblique direction based on the linear interpolation algorithm; determine a third oblique reference weight of a third oblique protection pixel of the third current pixel in a third oblique direction based on the linear difference algorithm; and determine a fourth oblique reference weight of a fourth oblique protection pixel of the fourth current pixel in a fourth oblique direction based on the linear interpolation algorithm, wherein an average value of the target display weight of the first current pixel, the target display weight of the second current pixel, the target display weight of the third current pixel and the target display weight of the fourth current pixel is equal to an average value of the first oblique reference weight, the second oblique reference weight, the third oblique reference weight and the fourth oblique reference weight.

In an embodiment, the display unit 1806 is further configured to perform compression processing on the weight map according to a target ratio, wherein the target ratio is determined according to a resolution ratio of the landscape layer index map to the weight map; and acquire a target mapping formula, and input display coordinates in the compressed weight map into the target mapping formula for calculation to skip the protection pixel and obtain the target display weight corresponding to the pixel in the landscape layer index map.

In an embodiment, the display unit 1806 is further configured to acquire a reference parameter value associated with the target ratio; perform rounding processing on the display coordinates in the compressed weight map based on the reference parameter value to obtain a first intermediate value; perform remainder-taking processing on the display coordinates in the compressed weight map based on the reference parameter value to obtain a second intermediate value; and determine the target display weight obtained after skipping the protection pixel based on the first intermediate value and the second intermediate value.

In an embodiment, the apparatus 1800 for displaying the virtual landscape picture is further configured to acquire a plurality of landscape layer types included in the target landscape area to be displayed currently and determine a type weight corresponding to each landscape layer type in the plurality of landscape layer types; screen at least one target landscape layer type with a corresponding type weight which satisfies a preset condition from the plurality of landscape layer types, and acquire an index value of a landscape layer corresponding to each of the screened at least one target landscape layer type; sequentially store the index value in each image color channel of the landscape layer index map to obtain the landscape layer index map corresponding to the target landscape area to be displayed currently.

In an embodiment, the apparatus 1800 for displaying the virtual landscape picture is further configured to perform type weight ranking according to the size of the type weights of the plurality of landscape layer types, and acquire index values of landscape layers corresponding to first N landscape layer types according to a ranking result of the type weights.

For this embodiment, a reference may be made to the above method embodiments, which will not be repetitively described here.

Figure 19:
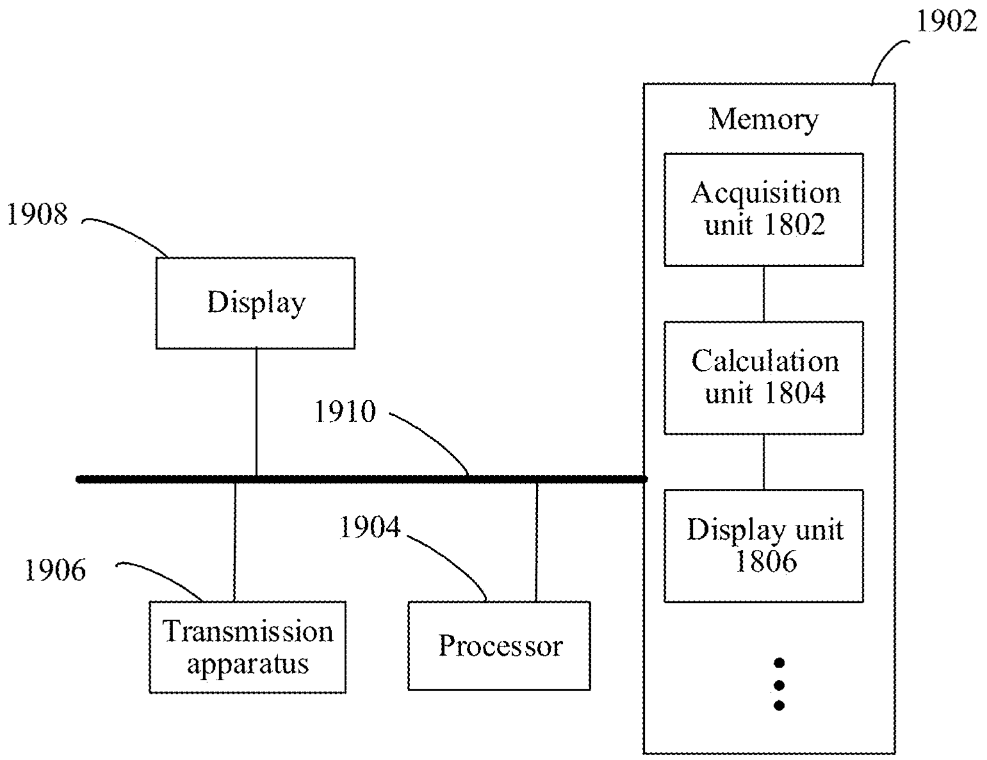
FIG. 19 is a schematic structural diagram of an electronic device according to an embodiment of the present application.

Another aspect of the embodiments of the present application further provides an electronic device for implementing the method for displaying a virtual landscape picture. The electronic device will be described by taking the terminal device illustrated in FIG. 1 as an example. As shown in FIG. 19, the electronic device includes a memory 1902 and a processor 1904. The memory 1902 stores a computer program. The processor 1904 is configured to perform the steps in any one of the foregoing method embodiments by executing the computer program.

In some embodiments, the electronic device may be located in at least one of a plurality of network devices in a computer network.

In some embodiments, the processor may be configured to perform the following steps by executing the computer program.

In step S1, a landscape layer index map corresponding to a target landscape area to be displayed currently and a weight map matching the landscape layer index map are acquired. Each pixel in each image color channel in the landscape layer index map is used for storing an index value of one landscape layer in a texture array. A display weight cluster of the one landscape layer is correspondingly stored in a pixel cluster in each image color channel of the weight map. The pixel cluster includes a reference pixel and a protection pixel matching the reference pixel. The reference pixel is a pixel having a mapping relationship with a pixel in the landscape layer index map. The protection pixel matching the reference pixel is a pixel having a positional association relationship with the reference pixel and representing a virtual landscape layer. The display weight cluster includes a target display weight corresponding to the reference pixel and a reference weight corresponding to the protection pixel.

In step S2, filtering calculation is performed on each pixel cluster in the weight map to skip a protection pixel and obtain a target display weight corresponding to a pixel in the landscape layer index map.

In step S3, picture rendering is performed according to the landscape layer index map and the target display weight in the weight map to display the virtual landscape picture corresponding to the target landscape area.

In some embodiments, persons of ordinary skill in the art may understand that the structure shown in FIG. 19 is only schematic. Alternatively, an electronic apparatus electronic device may also be a terminal device such as a smartphone (such as an Android mobile phone or an iOS mobile phone), a tablet computer, a palmtop computer, a mobile Internet device (MID), or a PAD. FIG. 19 does not limit the structure of the foregoing electronic apparatus electronic device. For example, the electronic apparatus electronic device may further include more or less components (such as a network interface, and the like) than those shown in FIG. 19, or have configuration different from that shown in FIG. 19.

The memory 1902 may be configured to store a software program and module, for example, a program instruction/module corresponding to the method and apparatus for displaying a virtual landscape picture in the embodiments of the present application, and the processor 1904 runs the software program and module stored in the memory 1902, to perform various function applications and data processing, that is, implement the method for displaying a virtual landscape picture. The memory 1902 may include a high-speed random access memory, and may also include a non-volatile memory, for example, one or more magnetic storage apparatuses, a flash memory, or another non-volatile solid-state memory. In some embodiments, the memory 1902 may further include memories remotely disposed relative to the processor 1904, and the remote memories may be connected to a terminal by using a network. The foregoing examples of the network include, but are not limited to, the Internet, an intranet, a local area network, a mobile communication network, and a combination thereof. The memory 1902 may be specifically configured to, but is not limited to, store information such as a landscape layer index map and a weight map. In an example, as shown in FIG. 19, the memory 1902 may include, but is not limited to, the acquisition unit 1802, the calculation unit 1804, and the display unit 1806 in the apparatus for displaying a virtual landscape picture. In addition, the memory may further include, but not limited to, other modules and units in the foregoing apparatus for displaying a virtual landscape picture. Details are not described herein again.

In some embodiments, a transmission apparatus 1906 is configured to receive or transmit data through a network. Specific instances of the foregoing network may include a wired network and a wireless network. In an example, the transmission apparatus 1906 includes an NIC. The NIC may be connected to another network device and a router by using a network cable, to communicate with the Internet or a local area network. In an example, the transmission apparatus 1906 is an RF module, which communicates with the Internet in a wireless manner.

In addition, the electronic device further includes: a display 1908 configured to display the virtual landscape picture; a connection bus 1910, configured to connect various module components in the electronic device.

In other embodiments, the foregoing terminal device or server may be a node in a distributed system. The distributed system may be a blockchain system. The blockchain system may be formed by a plurality of nodes through network communication. The nodes may form a peer to peer (P2P) network. Computing devices in any form, for example, electronic devices such as a server and a terminal, can join the P2P network to become a node in the blockchain system.

According to an aspect of this application, a computer program product or a computer program is provided, the computer program product or the computer program including computer instructions, the computer instructions being stored in a computer-readable storage medium. A processor of a computer device reads the computer instructions from the computer-readable storage medium, and executes the computer instructions, to cause the computer device to perform the foregoing method for displaying a virtual landscape picture. The computer program is configured to perform, when being run, steps in any one of the foregoing method embodiments.

In some embodiments, the computer-readable storage medium may be configured to store a computer program configured to perform the following steps.

In step S1, a landscape layer index map corresponding to a target landscape area to be displayed currently and a weight map matching the landscape layer index map are acquired. Each pixel in each image color channel in the landscape layer index map is used for storing an index value of one landscape layer in a texture array. A display weight cluster of the one landscape layer is correspondingly stored in a pixel cluster in each image color channel of the weight map. The pixel cluster includes a reference pixel and a protection pixel matching the reference pixel. The reference pixel is a pixel having a mapping relationship with a pixel in the landscape layer index map. The protection pixel matching the reference pixel is a pixel having a positional association relationship with the reference pixel and representing a virtual landscape layer. The display weight cluster includes a target display weight corresponding to the reference pixel and a reference weight corresponding to the protection pixel.

In step S2, filtering calculation is performed on each pixel cluster in the weight map to skip a protection pixel and obtain a target display weight corresponding to a pixel in the landscape layer index map.

In step S3, picture rendering is performed according to the landscape layer index map and the target display weight in the weight map to display the virtual landscape picture corresponding to the target landscape area.

In some embodiments, a person of ordinary skill in the art may understand that all or some of the steps of the various methods in the foregoing embodiments may be implemented by a program instructing hardware related to the terminal device. The program may be stored in a computer-readable storage medium. The storage medium may include: a flash drive, a Read-Only Memory (ROM), a Random Access Memory (RAM), a magnetic disk, an optical disc, and the like.

The sequence numbers of the embodiments of the present application are merely for the description purpose but do not imply the preference among the embodiments.

When the integrated unit in the foregoing embodiments is implemented in a form of a software functional unit and sold or used as an independent product, the integrated unit may be stored in the foregoing computer-readable storage medium. Based on such an understanding, the technical solutions of the present application essentially, or the part contributing to the prior art, or all or some of the technical solutions may be presented in the form of a software product. The computer software product is stored in the storage medium, and includes several instructions for instructing one or more computer devices (which may be a personal computer, a server, a network device, or the like) to perform all or some of the steps of the methods described in the embodiments of the present application.

In the foregoing embodiments of the present application, the descriptions of the embodiments have different focuses. For a part that is not detailed in an embodiment, reference may be made to the relevant description of other embodiments.

In the several embodiments provided in this application, it is to be understood that the disclosed client may be implemented in another manner. The apparatus embodiments described above are merely exemplary. For example, the division of the units is merely the division of logic functions, and may use other division manners during specific implementations. For example, a plurality of units or components may be combined, or may be integrated into another system, or some features may be omitted or not performed. In addition, the displayed or discussed mutual couplings or direct couplings or communication connections may be implemented through some interfaces. The indirect couplings or communication connections between the units or modules may be implemented in electrical or other forms.

The units described as separate components may or may not be physically separate, and components displayed as units may or may not be physical units, may be located in one position, or may be distributed on a plurality of network units. Some or all of the units may be selected according to a requirement to achieve the objectives of the solutions in the embodiments.

In addition, functional units in the embodiments of the present application may be integrated into one processing unit, or each of the units may be physically separated, or two or more units may be integrated into one unit. The integrated unit may be implemented in a form of hardware, or may be implemented in a form of a software function unit.

The foregoing descriptions are exemplary implementations of the present application. A person of ordinary skill in the art may make some improvements and modifications without departing from the principle of the present application and the improvements and modifications shall fall within the protection scope of the present application.

What is claimed is:

1. A method executed by a computing device that comprises a memory and a processor coupled to the memory, the method comprising:

acquiring, by the processor, a landscape layer index map corresponding to a target landscape area to be displayed, and acquiring a weight map matching the landscape layer index map, wherein:

a pixel in an image color channel in the landscape layer index map stores an index value of one landscape layer in a texture array, a display weight cluster of the one landscape layer is correspondingly stored in a pixel cluster in an image color channel of the weight map, the pixel cluster comprises a reference pixel and a protection pixel matching the reference pixel, the reference pixel having a mapping relationship with a pixel in the landscape layer index map, and the protection pixel matching the reference pixel having a positional association relationship with the reference pixel and representing a virtual landscape layer, and the display weight cluster comprises a target display weight corresponding to the reference pixel and a reference weight corresponding to the protection pixel;

determining, by the processor, the target display weight corresponding to the pixel in the landscape layer index map based on the reference pixels in the pixel clusters in the weight map; and rendering, by the processor, a picture according to the landscape layer index map and the target display weight in the weight map to display a virtual landscape picture corresponding to the target landscape area.

2. The method according to claim 1, wherein the protection pixels in the pixel clusters are skipped in determining the target display weight corresponding to the pixel in the landscape layer index map.

3. The method according to claim 2, wherein the determining, by the processor, the target display weight corresponding to the pixel in the landscape layer index map comprises:

compressing the weight map according to a target ratio, the target ratio being determined according to a resolution ratio of the landscape layer index map to the weight map; and acquiring a target mapping formula, and inputting display coordinates in the compressed weight map into the target mapping formula to skip the protection pixel and obtain the target display weight corresponding to the pixel in the landscape layer index map.

4. The method according to claim 3, wherein the inputting display coordinates in the compressed weight map into the target mapping formula to skip the protection pixel and obtain the target display weight corresponding to the pixel in the landscape layer index map comprises:

acquiring a reference parameter value associated with the target ratio;

rounding the display coordinates in the compressed weight map based on the reference parameter value to obtain a first intermediate value;

obtaining a second intermediate value by taking remainders on the display coordinates in the compressed weight map based on the reference parameter value; and determining the target display weight obtained after skipping the protection pixel based on the first intermediate value and the second intermediate value.

5. The method according to claim 1, further comprising:

for each group of adjacent pixels in a plurality of groups of adjacent pixels in the landscape layer index map, determining, by the processor, a first pixel cluster corresponding to a first adjacent pixel in a current group of adjacent pixels and determining a second pixel cluster corresponding to a second adjacent pixel in the current group of adjacent pixels;

performing, by the processor, linear interpolation processing on the current group of adjacent pixels according to the target display weight of the reference pixel in the first pixel cluster, the reference weight of the protection pixel in the first pixel cluster, the target display weight of the reference pixel in the second pixel cluster and the reference weight of the protection pixel in the second pixel cluster to obtain a transition weight; and performing, by the processor, smooth transition rendering on the current group of adjacent pixels according to the transition weight;

wherein the displaying the virtual landscape picture corresponding to the target landscape area comprises displaying the virtual landscape picture corresponding to the target landscape area according to a picture rendering result and a smooth transition rendering result.

6. The method according to claim 1, wherein the method further comprises:

for each image color channel of the landscape layer index map, sequentially determining, by the processor, a protection pixel matching each pixel in the image color channel in each direction and determining the reference weight corresponding to each of the protection pixels to generate the weight map.

7. The method according to claim 6, wherein the protection pixel comprises a first protection pixel and a second protection pixel, a reference weight of the first protection pixel is a first reference weight, a reference weight of the second protection pixel is a second reference weight, and for each image color channel of the landscape layer index map, the sequentially determining, by the processor, the protection pixel matching each pixel in the image color channel in each direction and determining the reference weight corresponding to each of the protection pixels to generate the weight map comprises:

for each image color channel of the landscape layer index map, iteratively traversing each pixel in the landscape layer index map by:

determining a current pixel pair from the landscape layer index map, the current pixel pair comprising a first current pixel and a second current pixel; and determining the first reference weight of the first protection pixel of the first current pixel in a first direction and the second reference weight of the second protection pixel of the second current pixel in a second direction based on a linear interpolation algorithm, the first direction and the second direction being opposite directions, and an average value of the target display weight of the first current pixel and the first reference weight of the first protection pixel being equal to an average value of the target display weight of the second current pixel and the second reference weight of the second protection pixel.

8. The method according to claim 7, wherein the protection pixel further comprises a first oblique protection pixel, a second oblique protection pixel, a third oblique protection pixel and a fourth oblique protection pixel, a reference weight of the first oblique protection pixel is a first oblique reference weight, a reference weight of the second oblique protection pixel is a second oblique reference weight, a reference weight of the third oblique protection pixel is a third oblique reference weight, a reference weight of the fourth oblique protection pixel is a fourth oblique reference weight, and the method further comprises:

determining, by the processor, a third current pixel associated with the first current pixel and a fourth current pixel associated with the second current pixel in the landscape layer index map;

determining, by the processor, the first oblique reference weight of the first oblique protection pixel of the first current pixel in a first oblique direction based on the linear interpolation algorithm;

determining, by the processor, the second oblique reference weight of the second oblique protection pixel of the second current pixel in a second oblique direction based on the linear interpolation algorithm;

determining, by the processor, the third oblique reference weight of the third oblique protection pixel of the third current pixel in a third oblique direction based on the linear difference algorithm; and determining, by the processor, the fourth oblique reference weight of the fourth oblique protection pixel of the fourth current pixel in a fourth oblique direction based on the linear interpolation algorithm, wherein an average value of the target display weight of the first current pixel, the target display weight of the second current pixel, the target display weight of the third current pixel and the target display weight of the fourth current pixel is equal to an average value of the first oblique reference weight, the second oblique reference weight, the third oblique reference weight and the fourth oblique reference weight.

9. The method according to claim 1, wherein the acquiring, by the processor, a landscape layer index map corresponding to a target landscape area to be displayed comprises:

acquiring a plurality of landscape layer types comprised in the target landscape area to be displayed and determining a type weight corresponding to each landscape layer type in the plurality of landscape layer types;

screening at least one target landscape layer type with a corresponding type weight which satisfies a condition from the plurality of landscape layer types, and acquiring an index value of a landscape layer corresponding to each of the screened at least one target landscape layer type; and sequentially storing the index value in each image color channel of the landscape layer index map to obtain the landscape layer index map corresponding to the target landscape area to be displayed.

10. The method according to claim 9, wherein the screening at least one target landscape layer type with a corresponding type weight which satisfies a condition from the plurality of landscape layer types, and acquiring an index value of a landscape layer corresponding to each of the screened at least one target landscape layer type comprises:

performing type weight ranking according to a size of the type weights of the plurality of landscape layer types, and acquiring index values of landscape layers corresponding to first N landscape layer types according to a ranking result of the type weights.

11. A non-transitory computer-readable storage medium, storing computer-readable instructions, the computer-readable instructions, when executed by one or more processors, causing the one or more processors to perform:

acquiring a landscape layer index map corresponding to a target landscape area to be displayed, and acquiring a weight map matching the landscape layer index map, wherein:

a pixel in an image color channel in the landscape layer index map stores an index value of one landscape layer in a texture array, a display weight cluster of the one landscape layer is correspondingly stored in a pixel cluster in an image color channel of the weight map, the pixel cluster comprises a reference pixel and a protection pixel matching the reference pixel, the reference pixel having a mapping relationship with a pixel in the landscape layer index map, and the protection pixel matching the reference pixel having a positional association relationship with the reference pixel and representing a virtual landscape layer, and the display weight cluster comprises a target display weight corresponding to the reference pixel and a reference weight corresponding to the protection pixel;

determining the target display weight corresponding to the pixel in the landscape layer index map based on the reference pixels in the pixel clusters in the weight map; and rendering a picture according to the landscape layer index map and the target display weight in the weight map to display a virtual landscape picture corresponding to the target landscape area.

12. The computer-readable storage medium according to claim 11, wherein the protection pixels in the pixel clusters are skipped in determining the target display weight corresponding to the pixel in the landscape layer index map.

13. The computer-readable storage medium according to claim 12, wherein the determining the target display weight corresponding to the pixel in the landscape layer index map comprises:

compressing the weight map according to a target ratio, the target ratio being determined according to a resolution ratio of the landscape layer index map to the weight map; and acquiring a target mapping formula, and inputting display coordinates in the compressed weight map into the target mapping formula to skip the protection pixel and obtain the target display weight corresponding to the pixel in the landscape layer index map.

14. The computer-readable storage medium according to claim 13, wherein the inputting display coordinates in the compressed weight map into the target mapping formula to skip the protection pixel and obtain the target display weight corresponding to the pixel in the landscape layer index map comprises:

acquiring a reference parameter value associated with the target ratio;

rounding the display coordinates in the compressed weight map based on the reference parameter value to obtain a first intermediate value;

obtaining a second intermediate value by taking remainders on the display coordinates in the compressed weight map based on the reference parameter value; and determining the target display weight obtained after skipping the protection pixel based on the first intermediate value and the second intermediate value.

15. The computer-readable storage medium according to claim 11, wherein the computer-readable instructions further cause the one or more processors to perform:

for each group of adjacent pixels in a plurality of groups of adjacent pixels in the landscape layer index map, determining a first pixel cluster corresponding to a first adjacent pixel in a current group of adjacent pixels and determining a second pixel cluster corresponding to a second adjacent pixel in the current group of adjacent pixels;

performing linear interpolation processing on the current group of adjacent pixels according to the target display weight of the reference pixel in the first pixel cluster, the reference weight of the protection pixel in the first pixel cluster, the target display weight of the reference pixel in the second pixel cluster and the reference weight of the protection pixel in the second pixel cluster to obtain a transition weight; and performing smooth transition rendering on the current group of adjacent pixels according to the transition weight;

wherein the displaying the virtual landscape picture corresponding to the target landscape area comprises displaying the virtual landscape picture corresponding to the target landscape area according to a picture rendering result and a smooth transition rendering result.

16. The computer-readable storage medium according to claim 11, wherein before the acquiring the weight map matching the landscape layer index map, the computer-readable instructions further cause the one or more processors to perform:

for each image color channel of the landscape layer index map, sequentially determining a protection pixel matching each pixel in the image color channel in each direction and determining the reference weight corresponding to each of the protection pixels to generate the weight map.

17. The computer-readable storage medium according to claim 16, wherein the protection pixel comprises a first protection pixel and a second protection pixel, a reference weight of the first protection pixel is a first reference weight, a reference weight of the second protection pixel is a second reference weight, and for each image color channel of the landscape layer index map, the sequentially determining the protection pixel matching each pixel in the image color channel in each direction and determining the reference weight corresponding to each of the protection pixels to generate the weight map comprises:

for each image color channel of the landscape layer index map, iteratively traversing each pixel in the landscape layer index map by:

determining a current pixel pair from the landscape layer index map, the current pixel pair comprising a first current pixel and a second current pixel; and determining the first reference weight of the first protection pixel of the first current pixel in a first direction and the second reference weight of the second protection pixel of the second current pixel in a second direction based on a linear interpolation algorithm, the first direction and the second direction being opposite directions, and an average value of the target display weight of the first current pixel and the first reference weight of the first protection pixel being equal to an average value of the target display weight of the second current pixel and the second reference weight of the second protection pixel.

18. The computer-readable storage medium according to claim 16, wherein the protection pixel further comprises a first oblique protection pixel, a second oblique protection pixel, a third oblique protection pixel and a fourth oblique protection pixel, a reference weight of the first oblique protection pixel is a first oblique reference weight, a reference weight of the second oblique protection pixel is a second oblique reference weight, a reference weight of the third oblique protection pixel is a third oblique reference weight, a reference weight of the fourth oblique protection pixel is a fourth oblique reference weight, and the method further comprises:

determining a third current pixel associated with the first current pixel and a fourth current pixel associated with the second current pixel in the landscape layer index map;

determining the first oblique reference weight of the first oblique protection pixel of the first current pixel in a first oblique direction based on the linear interpolation algorithm;

determining the second oblique reference weight of the second oblique protection pixel of the second current pixel in a second oblique direction based on the linear interpolation algorithm;

determining the third oblique reference weight of the third oblique protection pixel of the third current pixel in a third oblique direction based on the linear difference algorithm; and determining the fourth oblique reference weight of the fourth oblique protection pixel of the fourth current pixel in a fourth oblique direction based on the linear interpolation algorithm, wherein an average value of the target display weight of the first current pixel, the target display weight of the second current pixel, the target display weight of the third current pixel and the target display weight of the fourth current pixel is equal to an average value of the first oblique reference weight, the second oblique reference weight, the third oblique reference weight and the fourth oblique reference weight.

19. An electronic device, comprising a memory and a processor, the memory storing computer-readable instructions, the computer-readable instructions, when executed by the processor, causing the processor to perform:

acquiring a landscape layer index map corresponding to a target landscape area to be displayed, and acquiring a weight map matching the landscape layer index map, wherein:

a pixel in an image color channel in the landscape layer index map stores an index value of one landscape layer in a texture array, a display weight cluster of the one landscape layer is correspondingly stored in a pixel cluster in an image color channel of the weight map, the pixel cluster comprises a reference pixel and a protection pixel matching the reference pixel, the reference pixel having a mapping relationship with a pixel in the landscape layer index map, and the protection pixel matching the reference pixel having a positional association relationship with the reference pixel and representing a virtual landscape layer, and the display weight cluster comprises a target display weight corresponding to the reference pixel and a reference weight corresponding to the protection pixel;

determining the target display weight corresponding to the pixel in the landscape layer index map based on the reference pixels in the pixel clusters in the weight map; and rendering a picture according to the landscape layer index map and the target display weight in the weight map to display a virtual landscape picture corresponding to the target landscape area.

20. The electronic device according to claim 19, wherein the protection pixels in the pixel clusters are skipped in determining the target display weight corresponding to the pixel in the landscape layer index map.

* * * * *